(12) United States Patent
Isono

(10) Patent No.: US 6,915,708 B2
(45) Date of Patent: Jul. 12, 2005

(54) DEVICE FOR DETECTING FORCE ACTING ON A VEHICLE WHEEL

(75) Inventor: Hiroshi Isono, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 81 days.

(21) Appl. No.: 10/180,490

(22) Filed: Jun. 27, 2002

(65) Prior Publication Data

US 2003/0000316 A1 Jan. 2, 2003

(30) Foreign Application Priority Data

Jun. 28, 2001 (JP) .......................................... 2001-196711

(51) Int. Cl.$^7$ ................................................. G01D 7/00
(52) U.S. Cl. .................................... 73/862.041; 73/862
(58) Field of Search ........................... 73/862, 862.041, 73/862.044, 862.043

(56) References Cited

U.S. PATENT DOCUMENTS

| | | | |
|---|---|---|---|
| 4,138,884 A | 2/1979 | Ruoff, Jr. et al. | |
| 4,748,844 A | 6/1988 | Yoshikawa et al. | |
| 5,313,828 A | 5/1994 | Kotzle et al. | |
| 5,883,384 A * | 3/1999 | Kato et al. | 250/231.13 |
| 5,894,094 A * | 4/1999 | Kuchler et al. | 73/862.044 |
| 6,270,172 B1 | 8/2001 | Shirai et al. | |
| 6,324,919 B1 * | 12/2001 | Larsen et al. | 73/862.043 |
| 6,631,337 B2 * | 10/2003 | Sommerfeld et al. | 702/106 |
| 6,681,646 B1 | 1/2004 | Bacher et al. | |
| 2001/0033106 A1 | 10/2001 | Shirai et al. | |

FOREIGN PATENT DOCUMENTS

| | | |
|---|---|---|
| DE | 26 41 342 A1 | 9/1976 |
| DE | 37 15 472 A1 | 5/1987 |
| DE | 41 33 418 C2 | 4/1993 |
| DE | 198 04 981 A1 | 2/1998 |
| EP | 0 816 817 A2 | 1/1998 |
| JP | B2 7-81923 | 9/1995 |
| JP | A 8-152370 | 6/1996 |
| JP | A 8-327480 | 12/1996 |
| JP | A 9-2240 | 1/1997 |
| JP | B2 2736392 | 1/1998 |
| JP | B2 2736395 | 1/1998 |
| WO | WO 00/47458 | 8/2000 |

\* cited by examiner

*Primary Examiner*—Edward Lefkowitz
*Assistant Examiner*—Andre Allen
(74) *Attorney, Agent, or Firm*—Oliff & Berridge PLC

(57) ABSTRACT

A device for detecting force acting on a vehicle wheel, is mounted in a vehicle and includes a disc wheel, and a vehicle body having a hub as a retaining body that rotatably retains the vehicle wheel integrally with the disc wheel and in which the disc wheel is mounted on the same axis as the vehicle wheel. The device includes a detector mounted between the disc wheel and the retaining body to receive force that is transmitted between the disc wheel and the retaining body, and which detects force acting on the vehicle wheel. With this device, it is possible to detect force acting on the vehicle wheel without being restricted by either the disc wheel or the hub. Accordingly, this device facilitates highly accurate detection of force acting on the vehicle wheel by optimizing the arrangement, structure, and shape and the like of parts.

60 Claims, 22 Drawing Sheets

DISC WHEEL SIDE   HUB SIDE

FIG. 12
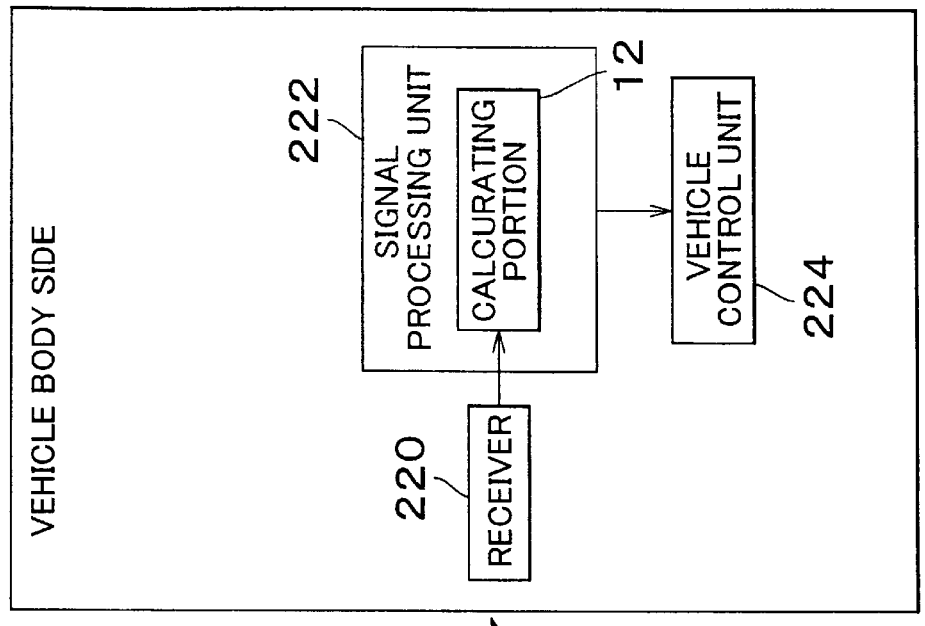
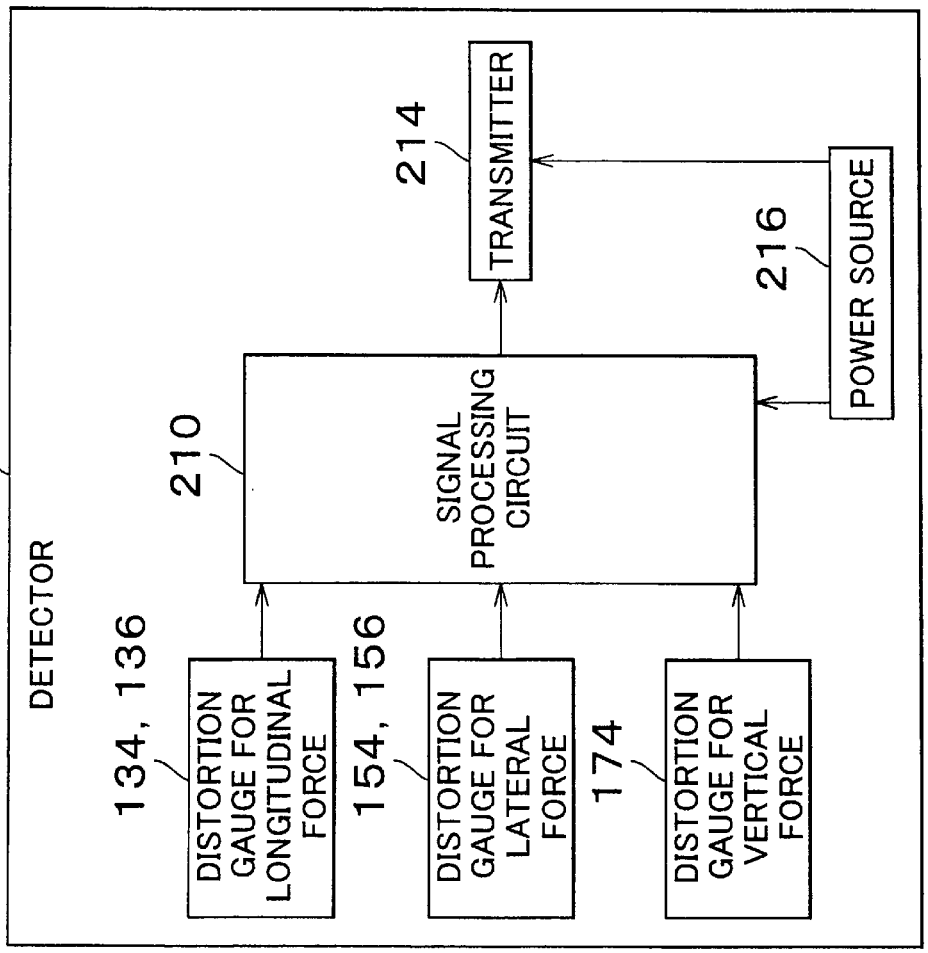

FIG. 19

| DETECTING PORTION | LONGITUDINAL FORCE | LATERAL FORCE | VERTICAL FORCE |
|---|---|---|---|
| A | WHEN MOVING FORWARD (DRIVING FORCE) / WHEN MOVING BACKWARD (BRAKING FORCE) | WHEN TOWARD OUTSIDE OF TURN | WHEN ACTING VERTICALLY |
| B | WHEN MOVING BACKWARD (DRIVING FORCE) / WHEN MOVING FORWARD (BRAKING FORCE) | WHEN TOWARD INSIDE OF TURN | WHEN ACTING VERTICALLY |
| C | WHEN MOVING FORWARD (DRIVING FORCE) / WHEN MOVING BACKWARD (BRAKING FORCE) | WHEN TOWARD OUTSIDE OF TURN | WHEN ACTING VERTICALLY |
| D | WHEN MOVING BACKWARD (DRIVING FORCE) / WHEN MOVING FORWARD (BRAKING FORCE) | WHEN TOWARD INSIDE OF TURN | WHEN ACTING VERTICALLY |

DEVICE FOR DETECTING FORCE ACTING ON A VEHICLE WHEEL

INCORPORATION REFERENCE

The disclosure of Japanese Patent Application No. 2001-196711 filed on Jun. 28, 2001 including the specification, drawings and abstract is incorporated herein by reference in its entirety.

BACKGROUND OF THE INVENTION

1. Field of Invention

The invention relates to technology for detecting force acting on a vehicle wheel.

2. Description of Related Art

One example of a conventional device for detecting force acting on a vehicle wheel detects a force acting on a tire in a vehicle and is disclosed in Japanese Patent Application Laid-Open Publication No. 9-2240. The device in this publication is installed in a vehicle which includes a vehicle wheel in which a tire is mounted on the outer periphery of a disc wheel, and a vehicle body having a retaining body that rotatably retains the vehicle wheel integrally with the disc wheel by having the disc wheel mounted on the same axis as the vehicle wheel. The retaining body in this case may be referred to as a hub, a hub carrier, a carrier, a spindle, or a disc wheel support or the like.

The publication further discloses that an existing vehicle axle is selected as a part of the vehicle to which a stress sensor, which serves as the device for detecting force acting on a tire, is mounted. However, when the device for detecting force acting on a tire is mounted on an existing part in a vehicle, it is easily restricted by that existing part. Therefore when using the device for detecting force acting on a tire disclosed in the aforementioned publication, it is difficult to detect with sufficiently high accuracy the necessary force acting on the tire.

SUMMARY OF THE INVENTION

An object of this invention is to facilitate highly accurate detection of force acting on a vehicle wheel, for example, on which a tire may be mounted.

According to the invention, the following aspects can be obtained. The aspects are described divided into sections with each aspect corresponding to one section, and each section having an individual section number. When appropriate, the section numbers of other sections will be quoted. This is to facilitate understanding of both the technical characteristics disclosed in this specification, as well as the multiple combinations thereof. The technical characteristics disclosed in this specification, as well as the combinations thereof, should by no means be understood to be limited to the following aspects.

(Section 1)

One aspect of the invention relates to a device for detecting force acting on a vehicle wheel, which is mounted in a vehicle and which includes a disc wheel, and a vehicle body having a retaining body that rotatably retains the vehicle wheel integrally with the disc wheel by having the disc wheel mounted on the same axis as the vehicle wheel. The device includes a detector mounted between the disc wheel and the retaining body in a state where force is being transmitted therebetween, which detects force acting on the vehicle wheel.

This device makes it possible to detect force acting on the vehicle wheel without being restricted by either the disc wheel or the retaining body.

Therefore, as opposed to a direct detection method in which a detector of the device for detecting force acting on a vehicle wheel is mounted on the vehicle wheel itself or on an existing member which rotates together with the vehicle wheel, this device makes it easy to design the arrangement, structure and shape and the like of parts necessary for the detection of force acting on a vehicle wheel with a high degree of flexibility.

Accordingly, this device makes it easy to improve the accuracy of detection of force acting on the vehicle wheel.

Also, according to this device, standardization of the arrangement, structure and shape and the like of parts used for the detection of force acting on the vehicle wheel, for example, makes it is easy to improve versatility of the device for use in a plurality of contrasting environments.

Further, this device detects force acting on the vehicle wheel in a portion where force is transmitted between the disc wheel and the retaining body.

Therefore, as opposed to an indirect detection method in which a detector of the device for detecting force acting on a vehicle wheel is mounted on a separate existing member which is independent of, and does not rotate with but receives force from, the vehicle wheel itself and an existing member that rotates together with the vehicle wheel, this device facilitates the accurate incorporation of a sufficient amount of information necessary for accurate detection of force acting on the vehicle wheel.

Accordingly, the device makes it easy to improve the accuracy of detection of force acting on the vehicle wheel by also relying on that incorporation.

In Section 1, force includes axial force, meaning force in the narrow sense of the word, as well as rotational force, which corresponds to moment or torque.

Also in Section 1, vehicle wheel can refer to a driven vehicle wheel that is driven by a power source of the vehicle, as well as to a non-driven vehicle wheel that rotates but which is not driven by the power source of the vehicle.

Also in Section 1, the detector can be constructed to detect only one type of force acting on a vehicle wheel or a plurality of types of force acting on a vehicle wheel.

(Section 2)

A second aspect of the invention relates to a device for detecting force acting on a vehicle wheel described in Section 1 and in which the detector is detachably mounted to the disc wheel and the retaining body.

According to this device, this detector is able to be newly mounted in a vehicle in which a detector of the device are not mounted, as well as used to replace a detector already mounted in a vehicle.

(Section 3)

A third aspect of the invention relates to a device for detecting force acting on a vehicle wheel described in Section 1 or Section 2 and in which the force includes at least one of: i) longitudinal force acting on the vehicle wheel in the longitudinal direction thereof, ii) lateral force acting on the vehicle wheel in the lateral direction thereof, iii) vertical force acting on the vehicle wheel in the vertical direction thereof, iv) torque around a longitudinal axis acting on the vehicle wheel around an axis extending in the longitudinal direction of the vehicle wheel, v) torque around a lateral axis acting on the vehicle wheel around an axis extending in the lateral direction of the vehicle wheel, and vi) torque around a vertical axis acting on the vehicle wheel around an axis extending in the vertical direction of the vehicle wheel.

(Section 4)

A fourth aspect of the invention relates to a device for detecting force acting on a vehicle wheel described in Section 1 or Section 2 and in which the force acting on the vehicle wheel includes longitudinal force acting on the vehicle wheel in the longitudinal direction thereof, lateral force acting on the vehicle wheel in the lateral direction thereof, and vertical force acting on the vehicle wheel in the vertical direction thereof.

(Section 5)

A fifth aspect of the invention relates to a device for detecting force acting on a vehicle wheel described in any one of Sections 1 through 4 and in which the detector includes: i) a moving portion on the disc wheel side (hereinafter referred to as "first moving portion") and a moving portion on the retaining body side (hereinafter referred to as "second moving portion") both provided between, and on the same axis as, the disc wheel and the retaining body, and which move together with the disc wheel and the retaining body, respectively, and ii) a detecting portion that detects force acting on the vehicle wheel based on the relative displacement of the first moving portion and the second moving portion.

This device detects force acting on a vehicle wheel using the relative displacement of the first moving portion and the second moving portion, which reflects the force acting on the vehicle wheel. Moreover, the relative displacement is easily expressed as a phenomenon that distinctly reflects force acting on the vehicle wheel by the relative displacement in the disc wheel or the retaining body. Therefore, this device makes it easy to improve the accuracy of detection of force acting on the vehicle wheel.

In Section 5, the motion includes both linear motion as well as rotational motion. Also in Section 5, the detecting portion can be constructed to detect the relative displacement of the first moving portion and the second moving portion by focusing on mechanical phenomena, electrical phenomena, electromagnetic phenomena, or optical phenomena.

(Section 6)

A sixth aspect of the invention relates to a device for detecting force acting on a vehicle wheel described in Section 5 and in which the first moving portion, the second moving portion, and the detecting portion are each constructed independent of one another.

(Section 7)

A seventh aspect of the invention relates to a device for detecting force acting on a vehicle wheel described in Section 5 or Section 6 and in which the first moving portion and the second moving portion are constructed as a first partition housing and a second partition housing, respectively, forming a closed internal space therebetween by engaging the first moving portion and the second moving portion together such that they are both relatively displaceable, and the detecting portion is disposed in this internally formed space.

According to this device, because the detecting portion is disposed in the closed internal space formed by the two relatively displaceable partition housings, it is easy to design the shape of the overall detector of the device such that the detecting portion can be protected from dust and water and the like, as well as such that the detector of the device for detecting force acting on a vehicle wheel is suitable to be mounted between the disc wheel and the retaining body, for example.

(Section 8)

An eighth aspect of the invention relates to a device for detecting force acting on a vehicle wheel described in any one of Sections 5 through 7 and in which the detecting portion is arranged near either the first moving portion or the second moving portion, whichever has the least tendency to increase in temperature when the vehicle is running.

According to this device, the detecting portion is arranged away from a heat source in the vehicle, such that it is easy to keep the temperature of the detecting portion from increasing when the vehicle is running.

(Section 9)

A ninth aspect of the invention relates to a device for detecting force acting on a vehicle wheel described in any one of Sections 5 through 8 and in which the detecting portion includes: i) a detecting member which is lower in rigidity than the first moving portion and the second moving portion, and which generates strain of an amount in accordance with the amount of relative displacement of the first moving portion and the second moving portion by being engaged therewith, and ii) a detecting element that converts that generated strain into an electrical signal.

According to this device, the detecting member which generates strain of an amount in accordance with the amount of relative displacement of the first moving portion and the second moving portion has a lower rigidity than, and engages with, the first moving portion and the second moving portion. Therefore, this device makes it easy to increase the sensitivity with respect to a change in force acting on the vehicle wheel in the detecting member by the first moving portion and the second moving portion. As a result, this device makes it easy to improve the accuracy of detection of force acting on the vehicle wheel by relying on the sensitivity of the detecting member.

In Section 9, the detecting element can be, for example, a strain gauge or a piezoelectric element. Also in Section 9, the detecting element can be, for example, mounted in a position where strain tends to occur on one of the detecting members, as well as of a construction to detect that strain.

(Section 10)

A tenth aspect of the invention relates to a device for detecting force acting on a vehicle wheel described in Section 9 and in which the detecting member is mounted on, and so as to be movable relative to, the first moving portion and the second moving portion, respectively, in a state in which force is being transmitted from the first moving portion and the second moving portion.

This device makes it easy to engage the detecting member with the first moving portion and the second moving portion in a state where only the force necessary for detecting force acting on the vehicle wheel exerted by the first moving portion and the second moving portion acts on the detecting member.

(Section 11)

An eleventh aspect of the invention relates to a device for detecting force acting on a vehicle wheel described in Section 9 and in which the detecting member is coupled with the first moving portion and the second moving portion, respectively, in a rigid state.

This device makes it easy to simplify the mounting construction of the detecting member and the first moving portion and the second moving portion.

(Section 12)

A twelfth aspect of the invention relates to a device for detecting force acting on a vehicle wheel described in any one of Sections 9 through 11 and in which the detecting member is a bent plate.

According to this device, it is possible to easily to reduce the number of parts of, and thereby simplify the construction of, the detecting member.

(Section 13)

A thirteenth aspect of the invention relates to a device for detecting force acting on a vehicle wheel described in any one of Sections 5 through 12 and in which the detecting portion includes: i) a first motion converting mechanism that mechanically converts relative displacement motion of the first moving portion and the second moving portion into rotational motion around the rotational axis of the vehicle wheel, ii) a second motion converting mechanism that mechanically converts the converted rotational motion into linear motion parallel with the rotational axis, and iii) a detecting element that converts axial force based on the converted linear motion into an electrical signal.

This device makes it possible to mechanically convert a relative displacement amount of the first moving portion and the second moving portion into axial force.

In Section 13, the detecting element can be constructed as a strain gauge or as a piezoelectric element. Further, presuming that the detecting element is used in conjunction with a mechanism that converts axial force into hydraulic pressure, the detecting element can be constructed as a hydraulic pressure sensor that detects that converted hydraulic pressure.

(Section 14)

A fourteenth aspect of the invention relates to a device for detecting force acting on a vehicle wheel described in Section 13 and in which: i) the relative displacement motion includes relative displacement motion around the rotational axis of the first moving portion and the second moving portion, ii) the first motion converting mechanism includes a gear mechanism that increases the speed of rotational motion of an input gear from the relative rotational motion by at least one gear speed and transmits the rotational motion of an increased speed to an output gear, and iii) the second motion converting mechanism includes a screw mechanism that converts rotational motion of a nut from the output gear into linear motion of a shaft screwed into the nut.

(Section 15)

A fifteenth aspect of the invention relates to a device for detecting force acting on a vehicle wheel described in Section 14 and in which: i) the shaft is arranged between the first moving portion and the second moving portion, and ii) the detecting element is arranged in two spaces formed in front and in back of the shaft between the first moving portion and the second moving portion, respectively, and is engaged with the shaft so as to receive compression force, but not tensile force, therefrom.

(Section 16)

A sixteenth aspect of the invention relates to a device for detecting force acting on a vehicle wheel described in any one of Sections 5 through 15 and in which the detecting portion can independently detect a plurality of types of force acting on the vehicle wheel.

According to this device, because one detecting portion can detect a plurality of types of force acting on the vehicle wheel, it is easy to reduce the number of detecting portions in proportion to the number of types of force acting on the vehicle wheel that are able to be detected compared with when one detecting portion is only able to detect one type of force acting on the vehicle wheel.

(Section 17)

A seventeenth aspect of the invention relates to a device for detecting force acting on a vehicle wheel described in Section 16 and in which the plurality of types of force acting on the vehicle wheel include longitudinal force acting on the vehicle wheel in the longitudinal direction thereof, lateral force acting on the vehicle wheel in the lateral direction thereof, and vertical force acting on the vehicle wheel in the vertical direction thereof.

According to this device, one detecting portion is able to detect all of the longitudinal force, lateral force, and vertical force acting on a vehicle wheel.

(Section 18)

An eighteenth aspect of the invention relates to a device for detecting force acting on a vehicle wheel described in Section 17 and in which the detecting portion is a detecting member: i) which is lower in rigidity than the first moving portion and the second moving portion, ii) which generates strain of an amount in accordance with the amount of relative displacement of the first moving portion and the second moving portion by being engaged therewith, and iii) which can be formed by bending a plate.

According to this device, one detecting portion is able to detect all of the longitudinal force, lateral force, and vertical force acting on a vehicle wheel. This device also makes it is possible to easily reduce the number of parts of, and thereby simplify the construction of, the detecting portion.

(Section 19)

A nineteenth aspect of the invention relates to a device for detecting force acting on a vehicle wheel described in any one of Sections 5 through 18 and in which a plurality of the detecting portions are arranged at evenly spaced intervals around the rotational axis of the vehicle wheel.

According to this device, because a plurality of detecting portions are distributed evenly around the rotational axis of the vehicle wheel, it is easy to prevent the relative displacement characteristics of the first moving portion and the second moving portion from inclining in a certain direction compared with when at least one detecting portion is arranged disproportionately.

Further according to this device, there is a tendency for the plurality of detecting portions to receive a load together following relative displacement of the first moving portion and the second moving portion. As a result, according to this device, there is a tendency for the load capacity which each detecting portion must withstand to become lighter compared with when only one detecting portion receives a load following relative displacement of the first moving portion and the second moving portion.

In Section 19, the number of detecting portions can be two, three, four, or five or more, for example. However, in view of designing the device, it is preferable to set the number of detecting portions so that at least one detecting portion is effectively functioning at any one instant when the position of the effectively functioning detecting portion changes according to the rotation angle of the vehicle wheel, rather than having all of the plurality of detecting portions always effectively functioning. For example, as described below, at least one detecting portion effectively functions at any one instant if there are three or more detecting portions when a plurality of detecting portions are arranged at evenly spaced intervals around the rotational axis of the vehicle wheel and a common transmitting portion is provided for this plurality of detecting portions for transmitting force from one of the first moving portion and the second moving portion to each detecting portion.

(Section 20)

A twentieth aspect of the invention relates to a device for detecting force acting on a vehicle wheel described in any one of Sections 5 through 19 and in which the force acting on the vehicle wheel has a forward direction and a reverse direction, and the detecting portion is able to detect the force acting on the vehicle wheel in both directions as well as identify the direction of the force acting on the vehicle wheel.

According to this device, not only the amount of a force acting on the vehicle wheel but also a forward or reverse direction thereof exists, and one detecting portion is sufficient when it is necessary to detect not only the amount but also the direction of the force acting on the vehicle wheel. The detecting portion is constructed so as to include a first detecting element that detects force acting on the vehicle wheel in only the forward direction and a second detecting element that detects force acting on the vehicle wheel in only the reverse direction.

(Section 21)

A twenty-first aspect of the invention relates to a device for detecting force acting on a vehicle wheel described in any one of Sections 5 through 19 and in which the force acting on the vehicle wheel has a forward direction and a reverse direction, and the detecting portion is able to detect the force acting on the vehicle wheel in only one of the forward direction and the reverse direction.

According to this device, not only the amount of a force acting on the vehicle wheel but also a forward direction and a reverse direction thereof exists, and a plurality of detecting portions is necessary for detecting forces acting on the vehicle wheel in different directions when it is necessary to detect not only the amount but also the direction of those forces acting on the vehicle wheel. However, because each individual detecting portion is adequately constructed to be able to detect force acting on the vehicle wheel in only one direction, it is easy to simplify construction thereof.

(Section 22)

A twenty-second aspect of the invention relates to a device for detecting force acting on a vehicle wheel described in any one of Sections 5 through 21 and in which the first moving portion and the second moving portion are able to rotate relative to one another around the rotational axis of the vehicle wheel. Furthermore, the detecting portion includes a longitudinal force detecting portion that detects longitudinal force acting on the vehicle wheel in the longitudinal direction thereof based on rotational torque which acts between the first moving portion and the second moving portion as a result of relative rotation thereof.

According to this device, longitudinal force on the vehicle wheel is able to be detected based on a physical quantity that accurately reflects longitudinal force on the vehicle wheel, that physical quantity also being rotational torque which acts between the first moving portion and the second moving portion as a result of relative rotation thereof. Accordingly, this device makes it easy to improve the accuracy of detection of longitudinal force acting on the vehicle wheel.

In Section 22, longitudinal force can be, for example, at least one of driving force and braking force.

(Section 23)

A twenty-third aspect of the invention relates to a device for detecting force acting on a vehicle wheel described in any one of Sections 5 through 22 and in which the first moving portion and the second moving portion are able to move relative to one another in the lateral direction of the vehicle wheel. Furthermore, the detecting portion includes a lateral force detecting portion that detects lateral force acting on the vehicle wheel in the lateral direction thereof based on axial force which acts between the first moving portion and the second moving portion as a result of relative movement thereof.

According to this device, lateral force on the vehicle wheel is able to be detected based on a physical quantity that accurately reflects lateral force on the vehicle wheel, the physical quantity also being axial force which acts between the first moving portion and the second moving portion as a result of relative movement thereof in the lateral direction the vehicle wheel. Accordingly, this device makes it easy to improve the accuracy of detection of lateral force acting on the vehicle wheel.

(Section 24)

A twenty-fourth aspect of the invention relates to a device for detecting force acting on a vehicle wheel described in any one of Sections 5 through 23 and in which the first moving portion and the second moving portion are able to move relative to one another in the vertical direction of the vehicle wheel. Furthermore, the detecting portion includes a vertical force detecting portion that detects vertical force acting on the vehicle wheel in the vertical direction thereof based on axial force which acts between the first moving portion and the second moving portion as a result of relative movement thereof.

According to this device, vertical force on the vehicle wheel is able to be detected based on a physical quantity that accurately reflects vertical force on the vehicle wheel (also referred to as "contact load"), the physical quantity also being axial force which acts between the first moving portion and the second moving portion as a result of relative movement thereof in the vertical direction the vehicle wheel. Accordingly, this device makes it easy to improve the accuracy of detection of vertical force acting on the vehicle wheel.

(Section 25)

A twenty-fifth aspect of the invention relates to a device for detecting force acting on a vehicle wheel described in any one of Sections 5 through 24 and in which the detecting portion includes a detecting element that converts strain or force generated based on a load transmitted from the first moving portion and the second moving portion to the detecting portion thereof into an electrical signal, and the detector further includes a reducing mechanism that mechanically reduces the strain or force generated in the detecting element in proportion to the load.

According to this device, strain or force generated in the detecting element of the detecting portion is reduced in proportion to the load transmitted from the first moving portion and the second moving portion to the detecting portion thereof. Accordingly, it is easy to reduce the load capacity that the detecting element must withstand. Therefore, the device makes it easy to reduce the capacity of the detecting element.

Reducing the load capacity of the detecting element also reduces the maximum load that the detecting element must detect. This means that it is easy to increase the detection sensitivity of the detecting element with the range width of the output signal from the detecting element under the same conditions. Therefore, the device according to this section makes it easy to improve the accuracy of detection of force acting on the vehicle wheel by increasing the sensitivity of the detection.

In Section 25, the detecting element can be constructed as a strain gauge or a piezoelectric element, for example. Further, presuming the detecting element is to be used in conjunction with a mechanism that converts axial force into hydraulic pressure, the detecting element can be constructed as a hydraulic pressure sensor that detects the converted hydraulic pressure.

Also in Section 25, the reducing mechanism can be of a construction that uses a principle of leverage, a gear mechanism, a screw mechanism, or that transmits force by fluid and piston.

(Section 26)

A twenty-sixth aspect of the invention relates to a device for detecting force acting on a vehicle wheel described in Section 25 and in which the reducing mechanism realizes mechanical reduction by using a principle of leverage.

(Section 27)

A twenty-seventh aspect of the invention relates to a device for detecting force acting on a vehicle wheel described in Section 26 and in which the detecting portion includes a detecting member which is lower in rigidity than the first moving portion and the second moving portion, and which generates strain of an amount in accordance with the amount of relative displacement of the first moving portion and the second moving portion by being engaged therewith. Furthermore, the detecting member functions as a lever in the relationship between the first moving portion and second moving portion and the detecting element.

(Section 28)

A twenty-eighth aspect of the invention relates to a device for detecting force acting on a vehicle wheel described in any one of Sections 5 through 27 and in which the detecting portion detects force acting on the vehicle wheel based on a load transmitted from the first moving portion and the second moving portion. The device for detecting force acting on a vehicle wheel further includes a limiting mechanism that mechanically limits the load transmitted from the first moving portion and the second moving portion to the detecting portion so that it does not exceed a set limit.

According to this device, because the load transmitted from the first moving portion and the second moving portion to the detecting portion is mechanically limited so that it does not exceed a set limit, it is easy to reduce the load capacity that the detecting portion must withstand. Accordingly, this device makes it easy to reduce the capacity of the detecting portion.

Reducing the load capacity of the detecting portion also reduces the maximum load that the detecting portion must detect. This means that it is easy to increase the detection sensitivity of the detecting element with the range width of the output signal from the detecting element under the same conditions. Therefore, the device according to this section makes it easy to improve the accuracy of detection of force acting on the vehicle wheel by increasing the sensitivity of the detection.

In Section 28, the set limit can be defined as the amount of load corresponding to an upper limit value of an actual use region of the force acting on the vehicle wheel, for example. The device according to this section makes improving the accuracy of detecting force acting on the vehicle wheel easier by relying on heightened detection sensitivity of the detecting portion if used together with the reducing mechanism in Section 25.

(Section 29)

A twenty-ninth aspect of the invention relates to a device for detecting force acting on a vehicle wheel described in Section 28 and in which the limiting mechanism limits a load exceeding the set limit from being transmitted to the detecting portion by having the first moving portion and the second moving portion abut together after the relative displacement amount of the second moving portion and the second moving portion has reached a reference value corresponding to the set limit.

(Section 30)

A thirtieth aspect of the invention relates to a device for detecting force acting on a vehicle wheel described in any one of Sections 5 through 29 and in which the first moving portion and the second moving portion are able to move relative to one another in the lateral direction of the vehicle wheel. Further, the detecting portion includes a lateral force detecting portion that detects lateral force acting on the vehicle wheel in the lateral direction thereof based on axial force which acts between the first moving portion and the second moving portion as a result of relative movement thereof. Moreover, the detector further includes a stopper that stops the first moving portion and the second moving portion from becoming separated from one another past a set limit in the lateral direction of the vehicle wheel by means of mechanical engagement.

According to this device, the first moving portion and the second moving portion are able to move relatively in the lateral direction of the vehicle wheel to detect lateral force on the vehicle wheel, but are prevented from becoming separated from one another past the set limit in the lateral direction of the vehicle wheel by means of mechanical engagement with the stopper.

Accordingly, this device makes it easy to detect lateral force on a vehicle wheel while reliably preventing the first moving portion and the second moving portion from becoming separated from one another.

(Section 31)

A thirty-first aspect of the invention relates to a device for detecting force acting on a vehicle wheel described in any one of Sections 5 through 30 and in which the detector further includes a preload applying mechanism that applies a preload between the first moving portion and the second moving portion in a direction in which free relative displacement of the second moving portion and the second moving portion is suppressed.

According to this device, it is possible to easily avoid play between the first moving portion and the second moving portion, for example. Further according to this device, because a preload is ultimately applied to the detecting portion as well, when the detecting portion is operating normally, the output signal from the detecting portion indicates a specific value that is not 0 when the force acting on the vehicle wheel is 0. Therefore according to this device, when the output signal from the detecting portion indicates 0 when the force acting on the vehicle wheel is 0, it is possible, for example, to determine that there may be an abnormality in the detecting portion itself or in a portion that transmits force to the detecting portion.

(Section 32)

A thirty-second aspect of the invention relates to a device for detecting force acting on a vehicle wheel described in Section 31 and in which the detecting portion includes a detecting member which is lower in rigidity than the first moving portion and the second moving portion, and which is elastically deformed in accordance with the amount of relative displacement of the first moving portion and the second moving portion by being engaged therewith. Furthermore, the preload applying mechanism includes a position regulating mechanism that regulates the relative position of the detecting member and the first moving portion and the second moving portion such that the detecting member is elastically deformed when the force acting on the vehicle wheel is 0.

According to this device, a preload is applied between the first moving portion and the second moving portion by elastic force from the detecting member itself. Therefore according to this device, the addition of a special member for applying a preload to between the first moving portion and the second moving portion is no longer necessary.

(Section 33)

A thirty-third aspect of the invention relates to a device for detecting force acting on a vehicle wheel described in any one of Sections 5 through 32 and in which the detecting portion includes a detecting element that converts force acting on the vehicle wheel into an electrical signal. Furthermore, the device for detecting force acting on a vehicle wheel includes a calculating portion that calculates force acting on the vehicle wheel based on the output signal of that detecting element.

In this and all other sections, the calculating portion can be mounted inside the detector or on the car vehicle body side.

(Section 34)

A thirty-fourth aspect of the invention relates to a device for detecting force acting on a vehicle wheel described in any one of Sections 5 through 32 and in which the detecting portion is a detecting element that converts force acting on the vehicle wheel into an electrical signal. The detecting element outputs the electrical signal as an output signal which includes a characteristic of changing in accordance with the rotation angle of the vehicle wheel despite the fact that the actual value of force acting on the vehicle wheel does not change over time. Moreover, the device for detecting force acting on a vehicle wheel includes a calculating portion that calculates force acting on the vehicle wheel based on the output signal of the detecting element while taking that characteristic into account.

According to this device, force acting on the vehicle wheel is calculated based on the output signal of the detecting element while the characteristic in which the output signal from the detecting element changes in accordance with the rotation angle of the vehicle wheel despite the fact that the actual value of force acting on the vehicle wheel does not change over time is taken into account. Therefore, this device makes it easy to reduce error in the calculated value of force acting on the vehicle wheel regardless of that kind of characteristic.

(Section 35)

A thirty-fifth aspect of the invention relates to a device for detecting force acting on a vehicle wheel described in Section 34 and in which the vehicle includes a vehicle wheel rotation angle sensor that detects a rotation angle of the vehicle wheel, and the calculating portion calculates force acting on the vehicle wheel based on the output signal from the detecting element and the output signal from the vehicle wheel rotation angle sensor.

This device makes it easy to accurately calculate force acting on the vehicle wheel by taking into account both the output signal from the detecting element and the vehicle wheel rotation angle.

In this and all other sections, the vehicle wheel rotation angle sensor can be constructed, for example, as a vehicle wheel speed sensor that detects the rotation angle of a vehicle wheel in order to detect the angular velocity of the vehicle wheel.

(Section 36)

A thirty-sixth aspect of the invention relates to a device for detecting force acting on a vehicle wheel described in Section 34 and in which the vehicle includes a vehicle wheel rotation angle sensor that detects a rotation angle of the vehicle wheel, and the calculating portion corrects the output signal from the detecting element based on the output signal from the vehicle wheel rotation angle sensor.

According to this device, because the output signal from the detecting element is corrected based on the output signal from the vehicle wheel rotation angle sensor, it is easy to obtain a calculation value with little error for force acting on a vehicle wheel, regardless of the aforementioned characteristic.

(Section 37)

A thirty-seventh aspect of the invention relates to a device for detecting force acting on a vehicle wheel described in any one of Sections 5 through 32 and in which the detecting portion is a detecting element that converts force acting on the vehicle wheel into an electrical signal. The detecting element outputs the electrical signal as an output signal which has a characteristic of changing cyclically in accordance with the rotation angle of the vehicle wheel despite the fact that the actual value of force acting on the vehicle wheel does not change over time. Another characteristic of the output signal from the detecting element is that the maximum value of the output signal from the detecting element matches the actual value of force acting on the vehicle wheel. Moreover, the device for detecting force acting on a vehicle wheel also includes a calculating portion that calculates the maximum value of the output signal from the detecting element as the force acting on the vehicle wheel.

According to this device, by focusing on the characteristic in which the maximum value of the output signal of the detecting element matches the actual value of force acting on the vehicle wheel, it is easy to obtain a calculation value with little error for the force acting on the vehicle wheel without having to use a vehicle wheel rotation angle sensor.

(Section 38)

A thirty-eighth aspect of the invention relates to a device for detecting force acting on a vehicle wheel described in any one of Sections 5 through 32 and in which four of the detecting portions are arranged at equally spaced intervals of 90 degrees each around the rotational axis of the vehicle wheel, and each detecting portion includes a detecting element that converts force acting on the vehicle wheel into an electrical signal. The detecting element outputs the electrical signal as an output signal which has a characteristic of changing cyclically in accordance with the rotation angle of the vehicle wheel when the phase differs by 90 degrees with respect to an output signal of another detecting element despite the fact that the actual value of force acting on the vehicle wheel does not change over time. Moreover, the device for detecting force acting on a vehicle wheel also includes a calculating portion that calculates force acting on the vehicle wheel using the output signals from the four detecting elements or the square root of the sum of squares of the calculated value indicative of the output signals from the four detecting elements.

There may be cases in which the output signals from the four detecting elements in the four detecting portions arranged at equally spaced intervals of 90 degrees each around the rotational axis of the vehicle wheel, or the square root of the sum of squares of the calculated value indicative of those output signals, matches the force acting on the vehicle wheel regardless of the rotation angle of the vehicle wheel. It is based on this knowledge that, with the device according to this section, force acting on the vehicle wheel is calculated using the output signals from the four detecting elements or the square root of the sum of squares of the calculated value indicative of those output signals. Therefore according to this device, it is possible to easily obtain a calculation value with little error for the force acting on the vehicle wheel without using a vehicle wheel rotation angle sensor.

(Section 39)

A thirty-ninth aspect of the invention relates to a device for detecting force acting on a vehicle wheel described in any one of Sections 5 through 38 and in which the detecting portion includes a plurality of types of detecting elements that output an electrical signal in order to detect a plurality of types of forces acting on the vehicle wheel, respectively. Furthermore, an output signal from a first type of detecting element provided for detecting a first type of force acting on the vehicle wheel has a characteristic of being affected by a second type of force acting on the vehicle wheel to be detected by a second type of detecting element which is at least one other type of detecting element. Moreover, the device for detecting force acting on a vehicle wheel also includes a calculating portion that calculates the first type of force acting on the vehicle wheel based on the output signal from the first type of detecting element while taking that characteristic into account.

When the same detecting portion has a plurality of types of detecting elements in order for it to detect a plurality of types of forces acting on the vehicle wheel, the output signal from the first type of detecting element provided for detecting the first type of force acting on the vehicle wheel has a characteristic of being affected by the second type of force acting on the vehicle wheel to be detected by the second type of detecting element which is at least one other type of detecting element. Based on this knowledge, with the device according to this section, the first type of force acting on the vehicle wheel is calculated based on the output signal from the first type of detecting element while taking that characteristic into account. Therefore according to this device, it is easy to obtain a calculation value with little error for the first type of force acting on the vehicle wheel regardless of the aforementioned characteristic.

(Section 40)

A fortieth aspect of the invention relates to a device for detecting force acting on a vehicle wheel described in Section 39 and in which the calculating portion removes a component affected by the second type of force acting on the vehicle wheel from the output signal of the first type of detecting element based on the output signal from the second type of detecting element.

According to this device, a component that is effected by the second type of force acting on the vehicle wheel is removed from the output signal of the first type of detecting element based on the output signal from the second type of detecting element. Therefore according to this device, by removing a component affected by a type of force acting on the vehicle wheel that is different from the type of force acting on the vehicle wheel that is to be detected, it is easy to obtain a calculation value with little error for the force acting on the vehicle wheel to be detected.

(Section 41)

A forty-first aspect of the invention relates to a device for detecting force acting on a vehicle wheel described in any one of Sections 1 through 40 and in which the detector includes a detecting portion that detects force acting on the vehicle wheel and outputs an electrical signal indicative thereof, and a transmitter that transmits the output signal from that detecting portion as an electric wave to an external target of the transmission.

According to this device, because the transmission of the output signal from the detecting portion of the device to the external target is done by a wireless method, there is no need for a wire to send the output signal.

(Section 42)

A forty-second aspect of the invention relates to a device for detecting force acting on a vehicle wheel described in Section 41 and that further includes a receiver mounted on the vehicle body. Moreover, the transmitter transmits the output signal from the detecting portion as an electric wave to the receiver, with the vehicle body being the external target of the transmission.

According to this device, by employing a communication method in which electric waves are transmitted from a detector of the device to the vehicle body, that is, by using a wireless communication method, it is easy to reliably transmit information relating to force acting on the vehicle wheel, which was detected by the detector, to the vehicle body side regardless of relative movement, including relative rotation of the detector and the vehicle body. Further according to this device, by employing a communication method in which electric waves are transmitted from a detector of the device to the vehicle body, that is, by using a wireless communication method, it is not necessary to be concerned about friction between the contacting electrode portions, as compared with when using a slip ring, which will be described later.

(Section 43)

A forty-third aspect of the invention relates to a device for detecting force acting on a vehicle wheel described in Section 41 or 42 and in which the detector further includes a power source that supplies electric power to the detecting portion and the transmitter.

According to this device, it is possible to operate the detecting portion and the transmitter without relying on a power supply outside of the detector. In Section 43, the power supply can be a consumption type which can not be recharged while it is in use, or it can be a self-sufficient type that can be recharged while it is in use with power generated using the rotation of the wheels or other motion.

(Section 44)

A forty-fourth aspect of the invention relates to a device for detecting force acting on a vehicle wheel described in any one of Sections 1 through 40 and in which the detector includes a detecting portion that detects force acting on the vehicle wheel and outputs an electrical signal indicative of the detected force acting on the vehicle wheel. Furthermore, the device for detecting force acting on a vehicle wheel can be a slip ring provided on a portion where the second moving portion or the retaining body rotates relative to the vehicle body, and this slip ring may be a slip ring that transmits the output signal from the detecting portion to the vehicle body side.

(Section 45)

A forty-fifth aspect of the invention relates to a device for detecting force acting on a vehicle wheel described in any one of Sections 1 through 44 and in which the vehicle includes an actuator that controls a state of the vehicle, and a controller that controls a signal for driving the actuator based on force acting on the vehicle wheel detected by the device for detecting force acting on a vehicle wheel.

According to this device, it is possible to control the state of the vehicle based on the force acting on the vehicle wheel detected by the device.

According to an exemplary embodiment of the invention, all of the aspects of the invention may be applied to a vehicle wheel in which a tire is mounted on a periphery of the disc wheel. In this embodiment, the detected force is a force acting on the tire.

BRIEF DESCRIPTION OF THE DRAWINGS

The invention will be described with reference to the accompanying drawings in which like reference numerals are used to refer to like elements and wherein:

FIG. 12 is a block graph showing an electrical configuration of the device for detecting force acting on a tire according to the first embodiment of the invention;

FIG. 19 is a view showing in table form the conditions by which each detecting portion in FIG. 17 detects longitudinal force, lateral force, and vertical force, respectively, on the tire;

DETAILED DESCRIPTION OF PREFERRED EMBODIMENTS

Hereinafter, exemplary embodiments of the invention will be described in detail with reference to the accompanying drawings. The exemplary embodiments are arrangements in which a tire is mounted on a periphery of a disc wheel. As such, the detected force is a force acting on the tire. This force acting on the tire is more generically referred to as a force acting on the vehicle wheel. The invention is not limited to vehicle wheels in which a tire is mounted on a periphery of a disc wheel. For example, the invention also is applicable to train wheels in which the vehicle wheel includes a disc wheel with no tire mounted thereon. Thus, the invention is applicable to vehicle wheels without tires as well as to vehicle wheels that include tires.

Figure 1:
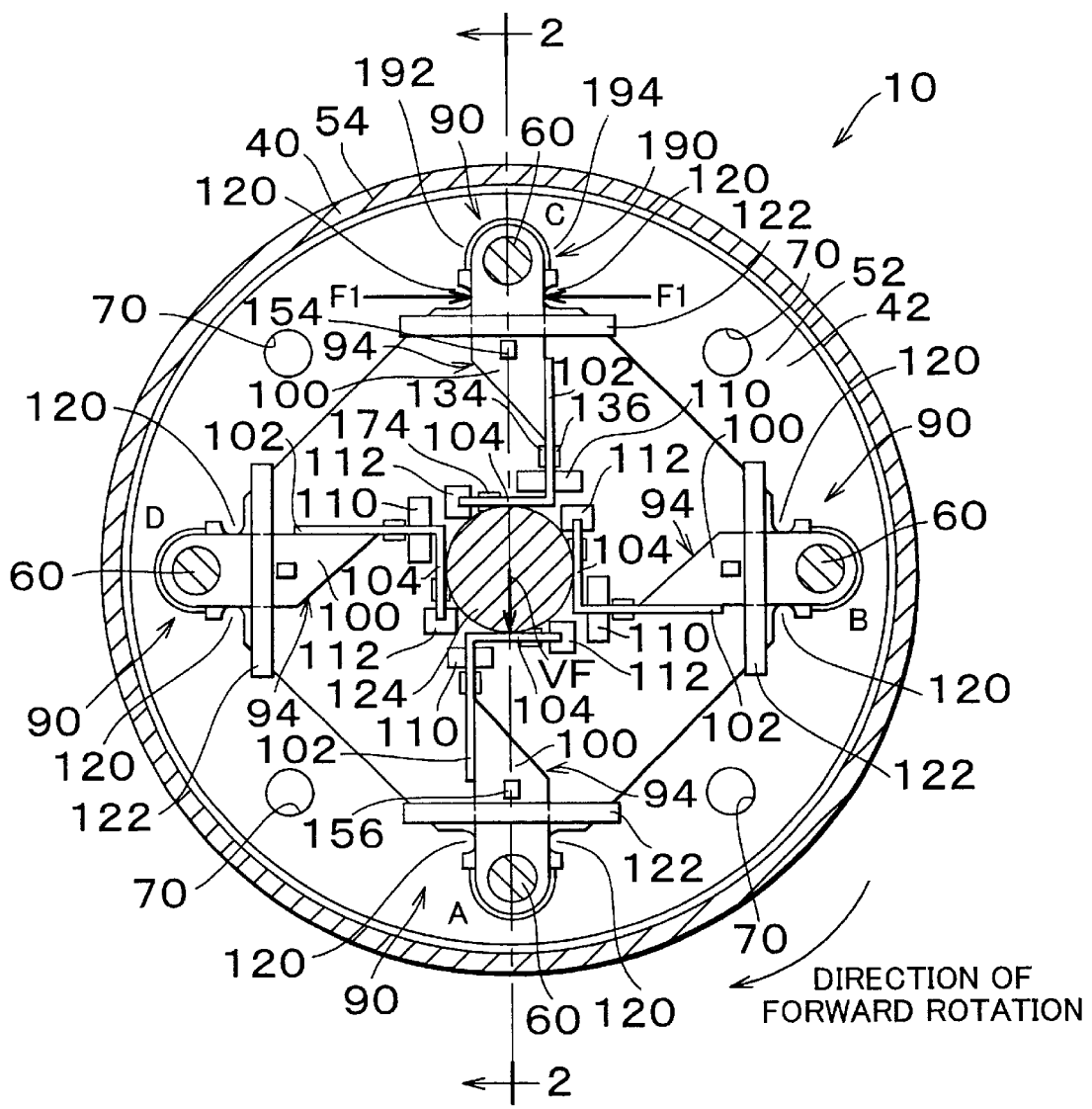
FIG. 1 is a front view showing an internal structure of a detector in a device for detecting force acting on a tire according to a first embodiment of the invention.
Figure 2:
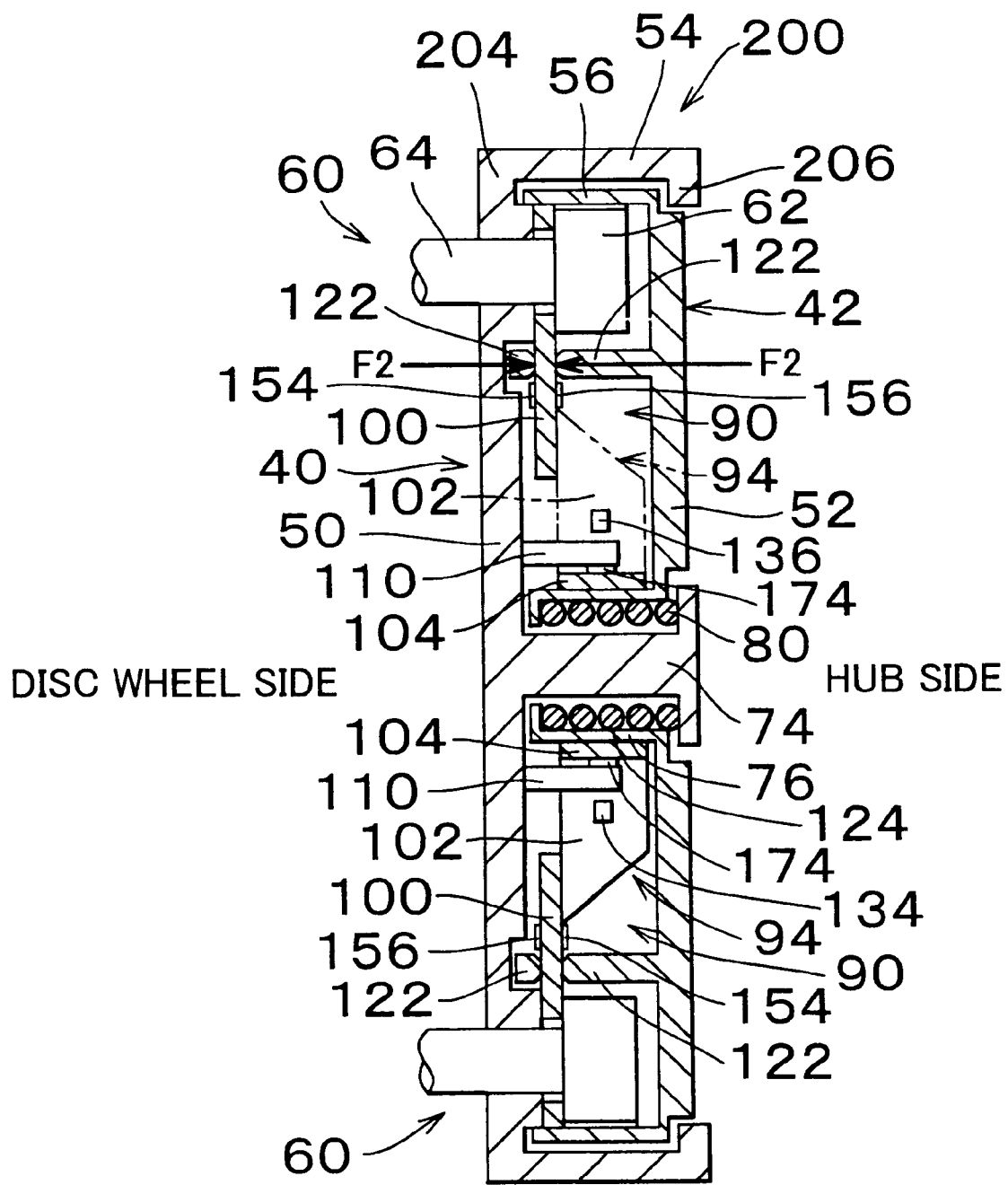
FIG. 2 is a sectional view taken along line 2—2 in FIG. 1.

FIG. 1 shows a front view and FIG. 2 shows a sectional view of the device for detecting force acting on a tire according to the first embodiment of the invention. This device for detecting force acting on a tire is constructed so as to include a detector 10 and a calculating portion 12 (see FIG. 12). FIGS. 1 and 2 only show the detector 10.

Figure 3:
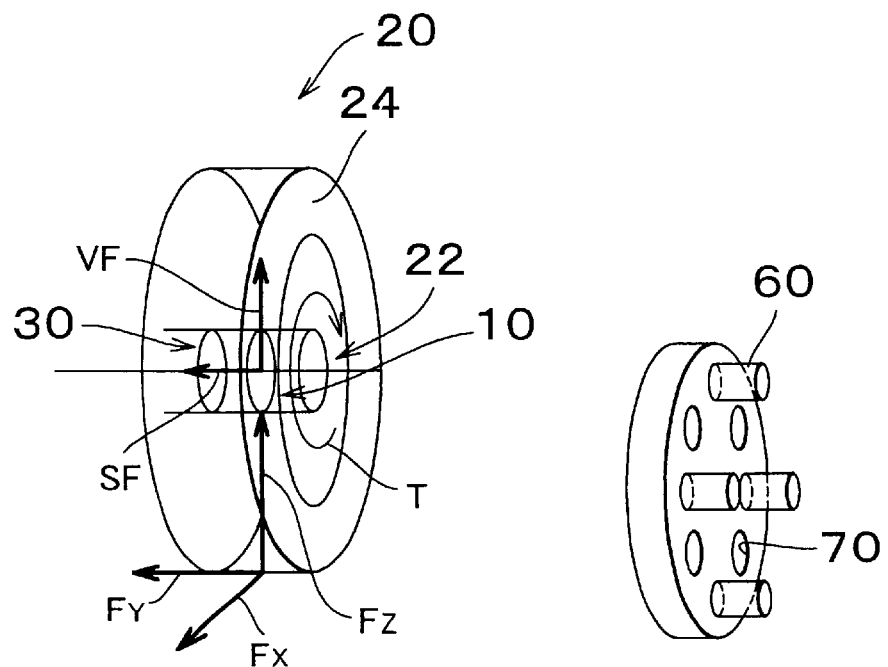
FIG. 3 is a perspective view showing a relative positional relationship between the detector, a disc wheel of a vehicle wheel and a hub on the vehicle body side in FIG. 1.

This device for detecting force acting on a tire is used mounted in a vehicle provided with a plurality of vehicle wheels. As shown in FIG. 3, each vehicle wheel 20 is constructed of a rubber tire 24 mounted on the periphery of a steel disc wheel 22. The plurality of these vehicle wheels 20 includes at least one driven vehicle wheel that is driven by a power source of the vehicle and at least one non-driven wheel that rotates but which is not driven by the power source of the vehicle.

For each vehicle wheel 20, the vehicle has a hub 30 which serves as a retaining body that rotatably retains the vehicle wheel 20 integrally with the disc wheel 22 because the disc wheel 22 is mounted on the same axis as the vehicle wheel 20. As shown in FIG. 3, the detector 10 is mounted on the vehicle by being detachably mounted between the hub 30 and the disc wheel 22 of each vehicle wheel 20. Furthermore, the detector 10 is mounted in the vehicle in a state where force is being transmitted between the hub 30 and the disc wheel 22.

FIG. 3 also shows the types of force acting on the tire that are detected by the detector 10. Those forces include rotational torque T based on longitudinal force (component Fx in direction X of the road surface reaction force) on the tire 24, lateral force SF (component Fy in direction Y of the road surface reaction force) on the tire 24, and vertical force VF (component Fz in direction Z of the road surface reaction force) on the tire 24. In this case, rotational torque T includes both driving torque and braking torque. Accordingly, longitudinal force includes both driving force and braking force.

Referring to FIG. 2, the detector 10 is constructed by fitting together two partition housings 40 and 42 that can be relatively displaced. Both of the partition housings 40 and 42 also have a cup shape in which the diameter of bottom portions 50 and 52 is longer than cylindrical portions 54 and 56 are high. These two partition housings 40 and 42 are fitted together oriented with the inside surfaces of the bottom surfaces 50 and 52 facing each other.

In this exemplary embodiment, of the two partition housings 40 and 42, the one with the larger diameter is denoted as the first partition housing 40 which is detachably mounted on, and on the same axis as, the disc wheel 22 with four tire mounting bolts 60 (see FIG. 1). The partition housing with the smaller diameter, on the other hand, is denoted as the second partition housing 42 which is detachably mounted on, and on the same axis as, the hub 30 with four hub mounting bolts, not shown.

As shown in FIG. 2, each of the four tire mounting bolts 60 is inserted from the disc wheel 22 side such that the shaft portion 64 of each of the four tire mounting bolts 60 protrudes through the first partition housing 40 and the head portion 62 of each of the four tire mounting bolts 60 is enclosed by the second partition housing 42. However, each tire mounting bolt 60 is used to firmly mount the first partition housing 40 on the disc wheel 22 in a state where relative displacement of each tire mounting bolt 60 with respect to the first housing is prevented, while relative displacement thereof with respect to the second partition housing 42 is permitted.

Conversely, each of the four hub mounting bolts, not shown, is such that the shaft portion thereof protrudes through to the inside of the second partition housing 42, while the head portion of each of the four mounting bolts is enclosed by the hub 30. FIG. 1 shows through-holes 70 in the second partition housing 42 through which the four hub mounting bolts are fitted. These four hub mounting bolts are used to firmly attach the second partition housing 42 to the hub 30.

That is, according to this exemplary embodiment, the first partition housing 40 constitutes one example of the first moving portion and the second partition housing 42 constitutes one example of the second moving portion.

Moreover, FIG. 1 is a view showing the detector 10 as seen from the disc wheel 22 side looking toward the hub 30 side, in a state in which the bottom portion 50 of the first partition housing 40 has been removed. In contrast to this, FIG. 2 is a sectional view taken along line 2—2 in FIG. 1. Also in FIG. 1, the direction of rotation of the detector 10, which follows the rotation of the tire 24 when the vehicle is moving forward, is expressed as "direction of forward rotation".

As shown in FIG. 2, a center shaft portion 74 extends outward from the inside surface of the bottom portion 50 of the first partition housing 40 on the same axis. A center cylindrical portion 76 also extends outward from the inside surface of the bottom portion 52 of the second partition housing 42 opposite from the center shaft portion 74. The center shaft portion 74 is slidably fitted with, and on the same axis as, the center cylindrical portion 76.

As shown in FIG. 2, a coil spring 80, which serves as an elastic member, is disposed between the two partition housings 40 and 42. This coil spring 80 urges the two partition housings 40 and 42 toward each other. Accordingly, a preload is applied between the two partition housings 40 and 42.

As is clear from the explanation above, according to this exemplary embodiment, the two partition housings 40 and 42 fit together at the corresponding cylindrical portions 54 and 56 and at the center shaft portion 74 and the center cylindrical portion 76, respectively. Relative rotation around the common rotational axis (which substantially matches, or is substantially parallel to, the rotational axis of the tire 24) of the two partition housings 40 and 42, relative movement in a direction parallel to that rotational axis, and relative movement in a direction perpendicular to that rotation axis are all permitted. Relative movement in the direction perpendicular to that rotational axis is permitted by radial clearance between the center shaft portion 74 and the center cylindrical portion 76.

That is, according to this exemplary embodiment, the relative rotation and those two types of relative movement work together, constituting relative displacement.

Referring back to FIG. 1, the detector 10 includes four detecting portions 90. These four detecting portions 90 are disposed radially and at evenly spaced intervals around the common rotational axis (hereinafter referred to as "detector axis") of the two partition housings 40 and 42. As a result, two adjacent detecting portions 90 are spaced 90 degrees apart around the detector axis.

Each detecting portion 90 includes a detecting member 94 engaged with the two partition housings 40 and 42. The two partition housings 40 and 42 reduce the rigidity of the detecting member 94, i.e., help the detecting member 94 to elastically deform easier.

According to this exemplary embodiment, the detecting member 94 is formed so as to have three structural portions 100, 102 and 104 by bending a single, flat steel plate. Of those structural portions 100, 102 and 104, both the first and second structural portions 100 and 102 extend parallel to the radial direction of the detector axis. The remaining third structural portion 104 extends at a right angle with respect to both the first and second structural portions 100 and 102.

All of the structural portions 100, 102 and 104 are shaped so as to function as beams having directionality in a section modulus of the lateral cross-section. According to the exemplary embodiment, they each have a long rectangular cross-section and are plate-shaped, extending straight. As a result, all of the structural portions 100, 102 and 104 function as members for transmitting force without elastic deformation by bending in one of two directions which are perpendicular to each other on a plane that is orthogonal to a neutral axis of the structural portions 100, 102 and 104, and by not bending in the other direction.

Referring to FIG. 2, the detecting member 94 is engaged with the first partition housing 40. The first partition housing 40 is separated from brake friction material, not shown, of a brake, also not shown, that inhibits rotation of the vehicle wheel 20 by the second partition housing 42. As a result, the first partition housing 40 is less prone to effects from heat of the brake friction material. More specifically, the detecting member 94 is engaged with the first partition housing 40 by means of the tire mounting bolts 60, which are firmly secured to the first partition housing 40, and first and second support members 110 and 112, which are firmly secured to the first partition housing 40. According to this exemplary embodiment, the detecting member 94 is supported by, and so as to be slidable around, the tire mounting bolts 60.

Therefore, according to this exemplary embodiment, because the detecting member 94 is engaged with the first partition housing 40 using the tire mounting bolts 60, it is easy to reduce the number of parts of the detector 10, as compared with when the detecting member 94 is engaged with the first partition housing 40 using a special engagement member.

Further, the detecting member 94 is also engaged with the second partition housing 42. More specifically, the detecting member 94 is engaged with the second partition housing 42 by means of: i) a first transmitting portion 120 that extends from the second partition housing 42 in a direction perpendicularly crossing the detector axis three-dimensionally, as shown in FIG. 1, ii) a second transmitting portion 122 that extends from the second partition housing 42 parallel with, but in a position offset from, the detector axis, as shown in FIG. 2, and iii) a third transmitting portion 124 formed on an outer peripheral portion of the center cylindrical portion 76 on the second partition housing 42, as also shown in FIG. 2.

Figure 4:
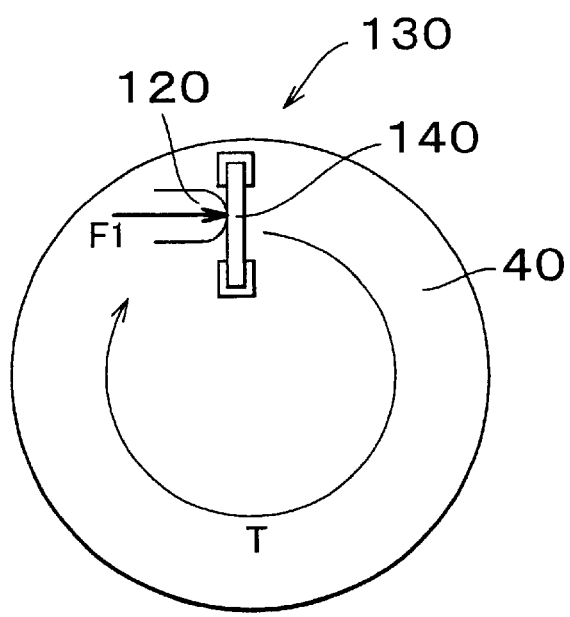
FIG. 4 is a front conceptual view showing a longitudinal force detecting portion of a detector in FIG. 1, this longitudinal force detecting portion detecting longitudinal force on a tire.
Figure 5:
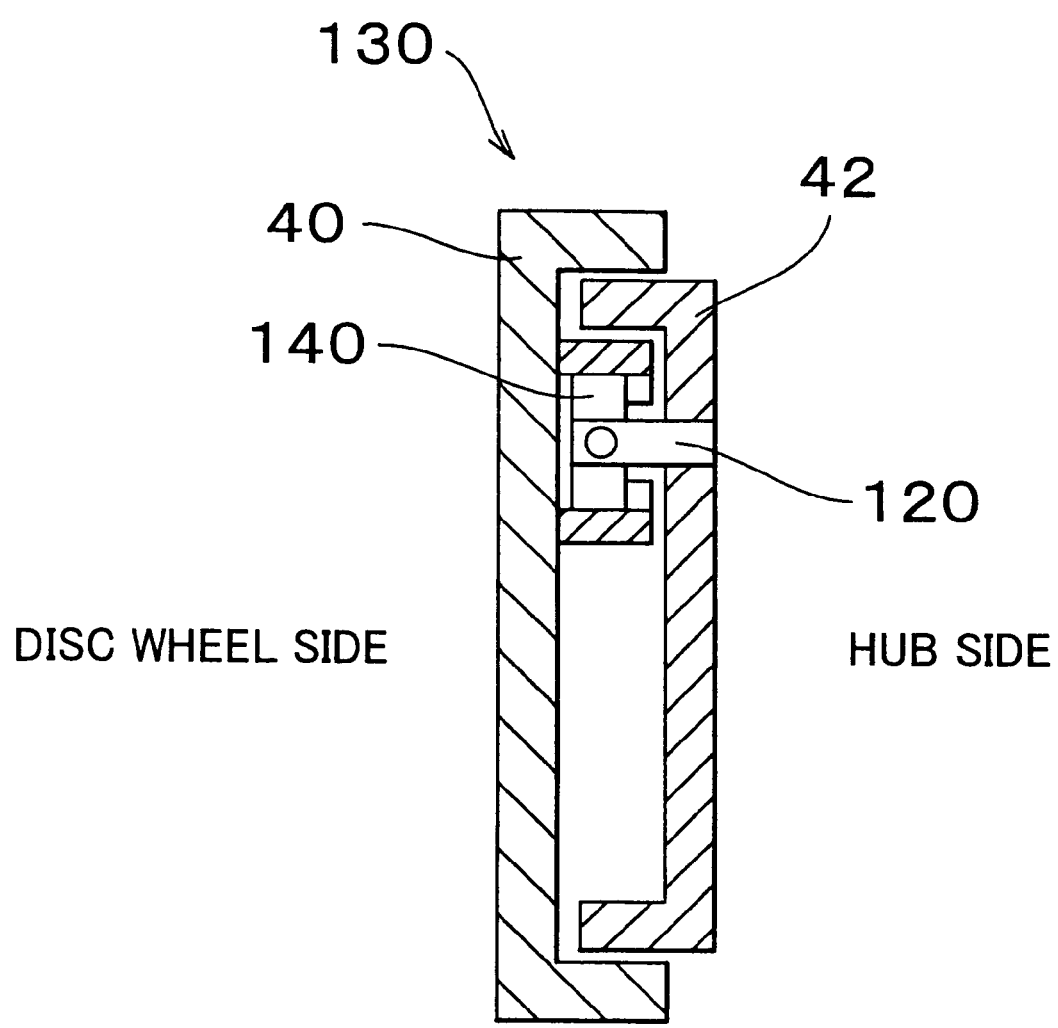
FIG. 5 is a side cross-sectional conceptual view showing the longitudinal force detecting portion in FIG. 4.

The first and second structural portions 100 and 102, the tire mounting bolts 60, the first support member 110 and the first transmitting portion 120 of each detecting portion 90 make up a longitudinal force detecting portion 130 (see FIG. 4 and FIG. 5). The above various portions, bolts and member of the longitudinal force detecting portion 130 all work together to enable it to detect longitudinal force acting on the tire 24 by converting rotation torque T of the tire 24 to a first axial force F1 that acts in a direction of a line tangent to a given location on any one circumference around the detector axis.

As shown in FIG. 1, when the first transmitting portion 120 is pushed against the detecting member 94, only the second structural member 102 of the first and second structural members 100 and 102 bends. This bending causes both opposing surfaces of the second structural portion 102 to strain in the direction of its thickness. Strain gauges 134 and 136 are attached to both of these surfaces. These strain gauges 134 and 136 detect the strain of each surface and convert it into an electrical signal.

According to this exemplary embodiment, the pair of strain gauges 134 and 136 are used to detect the strain according to the combination of the direction of movement of the vehicle (forward and backward) and the direction of longitudinal force to be detected (driving force and braking force). Both braking force when moving forward and driving force when moving backward generate strain in a first direction in each of the strain gauges 134 and 136. Conversely, both driving force when moving forward and braking force when moving backward generate strain in a second direction that is opposite the first direction in each of the strain gauges 134 and 136.

More specifically, the strain gauge 134, in which a tensile strain is generated when driving force as the vehicle moves forward acts on the tire 24 and when braking force as the vehicle moves backward acts on the tire 24, is used only for detecting driving force when the vehicle is moving forward and detecting braking force when the vehicle is moving backward.

In contrast, the strain gauge 136, in which a tensile strain is generated when driving force as the vehicle moves backward acts on the tire 24 and when braking force as the vehicle moves forward acts on the tire 24, is used only for detecting driving force when the vehicle is moving backward and detecting braking force when the vehicle is moving forward.

FIG. 4 and FIG. 5 schematically show a front view and a side sectional view, respectively, of the principle by which the longitudinal force detecting portion 130 detects longitudinal force (which corresponds to rotational moment T).

In FIGS. 4 and 5, reference numeral 140 denotes a first beam function portion of a detecting member 94, which functions as a beam in order to detect longitudinal force of the tire 24. This first beam function portion 140 is supported at both ends in the first partition housing 40. The first beam function portion 140 is constructed by coupling together in series: i) a first portion that functions as a beam that resists bending from longitudinal force on the tire 24, the first portion corresponding to the first structural portion 100, and ii) a second portion that functions as a beam that bends from longitudinal force on the tire 24, the second portion corresponding to the second structural portion 102. The first support member 110 prevents longitudinal force from being transmitted between the first and second structural portions 100 and 102 and the third structural portion 104.

Referring to FIG. 4, the first transmitting portion 120 is engaged with the first beam function portion 140. As a result, the rotational torque T is converted into the first axial force F1 by the first transmitting portion 120. The thus converted first axial force F1 then acts on the first beam function portion 140 in a shearing direction thereof. Accordingly, strain corresponding to the amount of rotational torque T is generated in the first beam function portion 140.

As shown in FIG. 1, it is also possible to consider the longitudinal force detecting portion 130 with the first and second structural portions 100 and 102 as constituting levers in which: i) the attachment point of the tire mounting bolts 60 and the first structural portion 100 is the fulcrum, ii) the contact point between the first transmitting portion 120 and the first structural portion 100 is the power point, and iii) the attachment point of the first support member 110 and the second structural portion 102 is the point of application. According to this principle of leverage, strain is generated in the strain gauges 134 and 136 which has been reduced in proportion to the amount of the first axial force F1.

Figure 6:
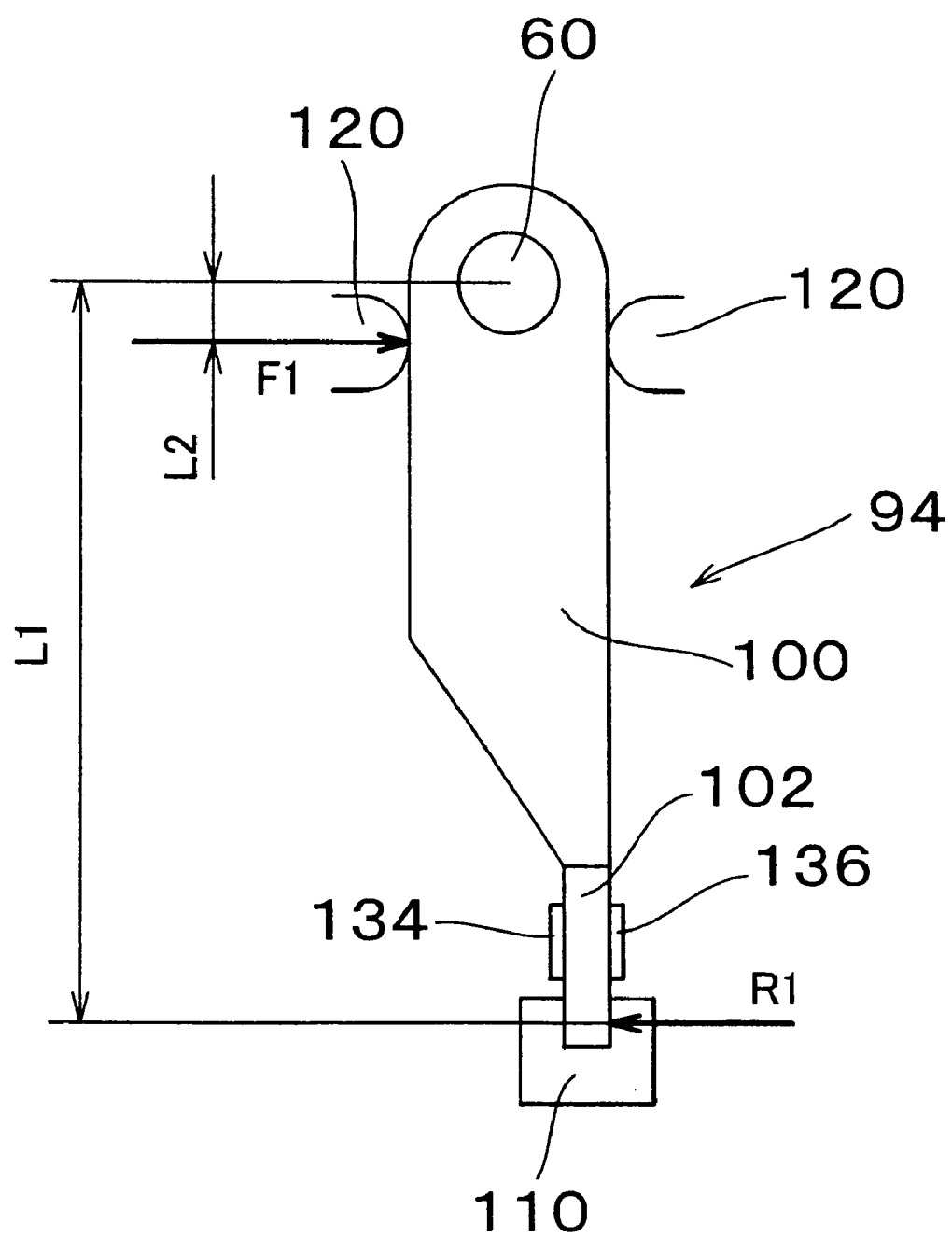
FIG. 6 is a front view for conceptually explaining a principle of leverage used by the longitudinal force detecting portion in FIG. 4.

FIG. 6 schematically shows this principle of leverage. In the figure, reference numeral L1 denotes the distance between the fulcrum and the point of application, reference numeral L2 denotes the distance between the fulcrum and the power point, and reference numeral R1 denotes a first reaction force generated at the point of application against the first axial force F1. Considering equilibrium of the moment around the fulcrum, in this lever the first reaction force R1 is obtained as $$R1 = F1 \times (L2/L1)$$

Because the value of (L2/L1), which represents the lever ratio, is less than 1, the reaction force R1 is less than the first reaction force F1. As a result, the bending moment acting on the strain gauges 134 and 136 is prevented from increasing such that the strain generated in the strain gauges 134 and 136 is also prevented from increasing.

Further, according to this exemplary embodiment, the first structural portion 100 and the second structural portion 102 are able to be coupled together in series by being integrally formed together. This coupling together in series is also possible by forming the first structural portion 100 and the second structural portion 102 independently of one another and then engaging them to each other in series. This is also possible for the lateral force detecting portion, which will be described later.

Moreover, according to this exemplary embodiment, a preload from the coil spring 80 is applied between the two partition housings 40 and 42. Accordingly, a preload is also applied to the detecting member 94 and a strain gauge for detecting lateral force, to be described later.

That is, according to this exemplary embodiment, the coil spring 80 is one example of the mechanism that applies the preload.

In this way, as a result of applying the preload, play between the two partition housings 40 and 42 is suppressed. Further, when the output signal from the strain gauge for detecting lateral force is 0, it is possible that there may be determined to be some sort of abnormality in a part (a mechanical or electrical part) relating to the detection of lateral force.

Figure 7:
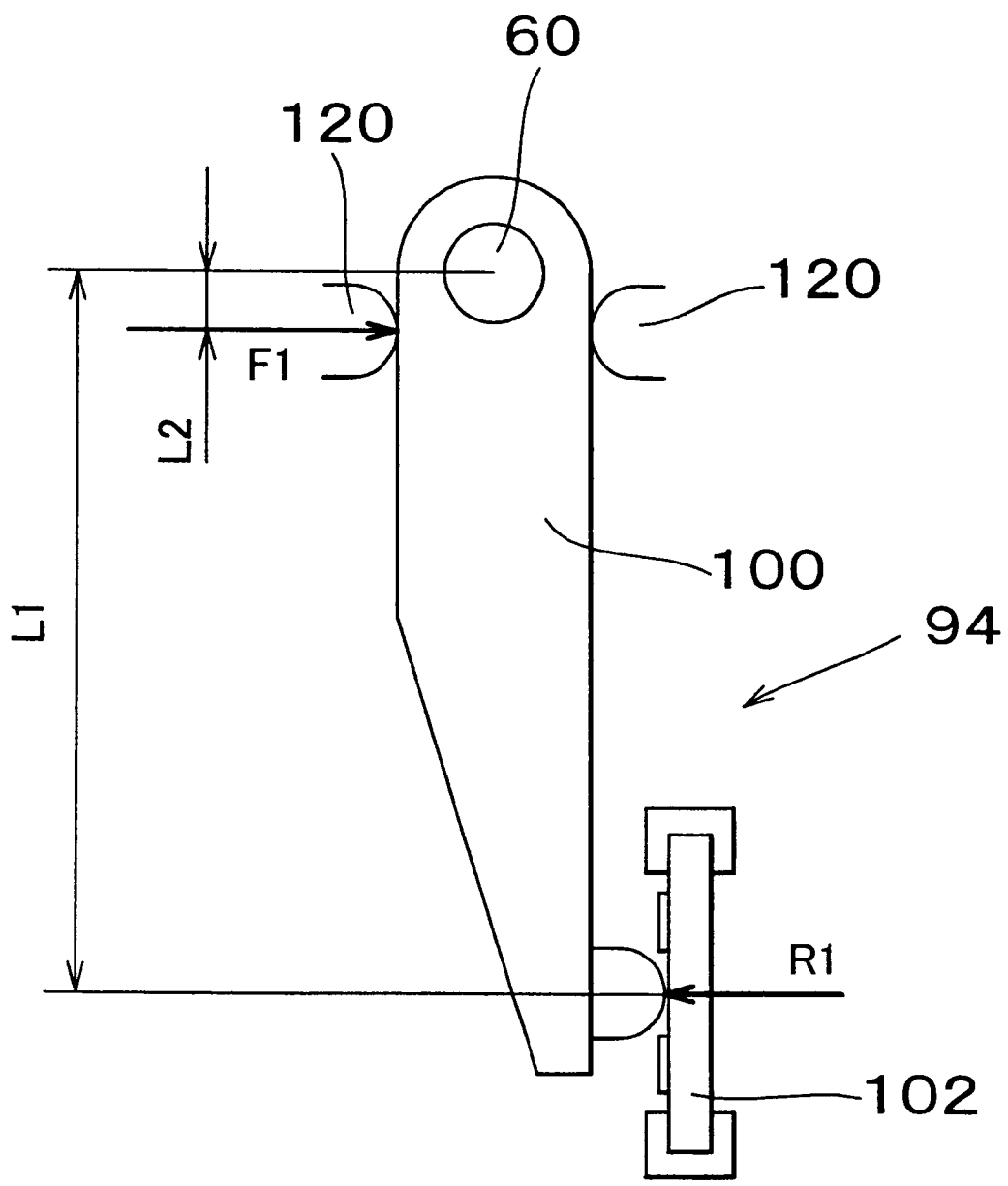
FIG. 7 is a front view for conceptually explaining another principle of leverage that can be employed by the longitudinal force detecting portion in FIG. 4.

FIG. 7 is an arrangement like FIG. 6, except that structural portion 102 is separate from (i.e., not integral with) portion 100, and the strain gauges are provided on a single side of the structural portion 102, rather than on both sides thereof.

Heretofore, the construction, in principle, of the longitudinal force detecting portion 130 that is within each detecting portion 90 and which is for detecting longitudinal force on the tire 24 has been described. Next, the construction, in principle, of the lateral force detecting portion that detects lateral force SF on the tire 24 will be described.

Figure 8:
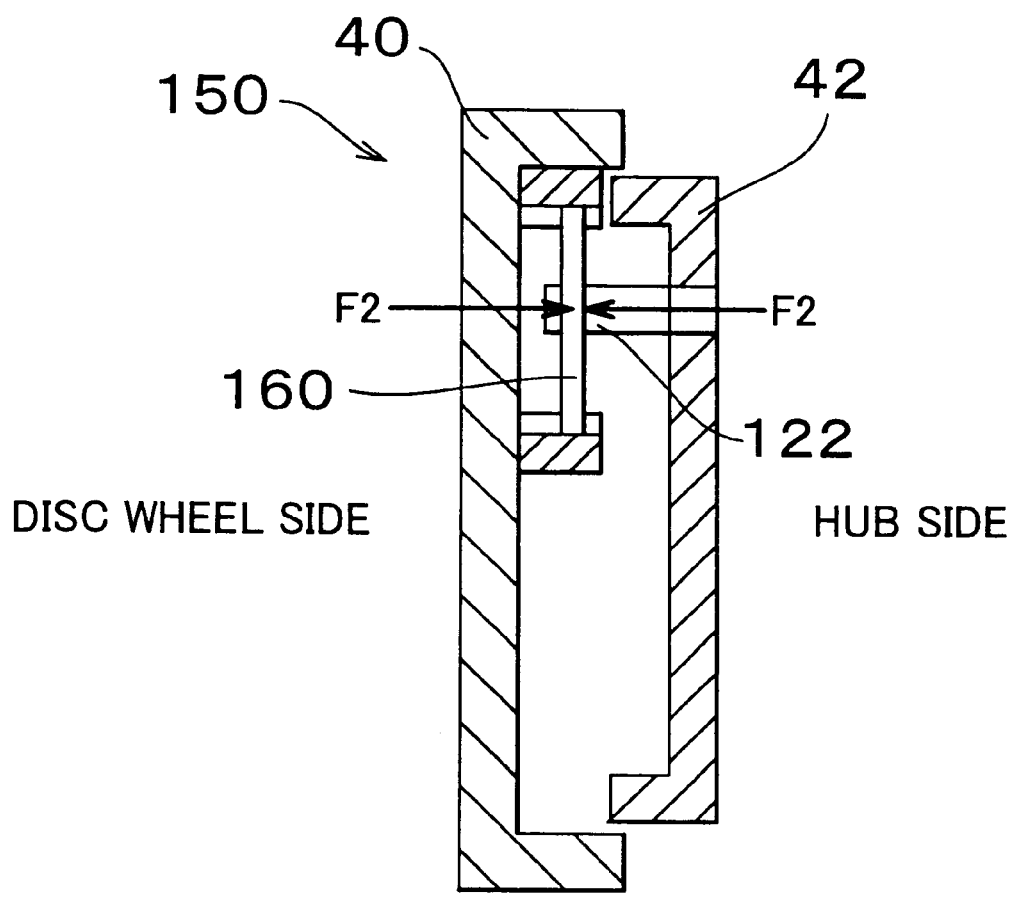
FIG. 8 is a side sectional view schematically showing a lateral force detecting portion of a detector in FIG. 1, this lateral force detecting portion detecting lateral force on the tire.

Referring to FIG. 2, similar to the lateral force detecting portion 130, the first and second structural portions 100 and 102, the tire mounting bolts 60, the first support member 110 and a second transmitting portion 122 of each detecting portion 90 make up a lateral force detecting portion 150 (see FIG. 8). The above various portions, bolts and member of the lateral force detecting portion 150 all work together to enable it to detect lateral force SF acting on the tire 24.

As shown in FIG. 2, when the second transmitting portion 122 is pushed against the detecting member 94, only the first structural member 100 of the first and second structural members 100 and 102 bends. This bending causes both opposing surfaces of the first structural portion 100 to strain in the direction of its thickness. Strain gauges 154 and 156 are attached to both of these surfaces. These strain gauges 154 and 156 detect the strain of each surface and convert it into an electrical signal.

According to this exemplary embodiment, this pair of strain gauges 154 and 156 is used to detect when lateral force SF on the tire 24 is acting toward the outside of a turn (to the left in FIG. 2), with respect to when it is acting toward the inside of a turn (to the right in FIG. 2). The strain gauge 154, in which tensile strain is generated when lateral force acts toward the outside, is used to detect lateral force SF only when that lateral force acts toward the outside. Conversely, the strain gauge 156, in which tensile strain is generated when lateral force acts toward the inside, is used to detect lateral force SF only when that lateral force acts toward the inside.

FIG. 8 schematically shows a side sectional view of the principle by which the lateral force detecting portion 150 detects lateral force SF.

In FIG. 8, reference numeral 160 denotes the second beam function portion that is within the detecting member 94 and which functions as a beam for detecting lateral force SF. This second beam function portion 160 is supported at both ends in the first partition housing 40. The second beam function portion 160 is constructed by coupling together in series i) a first portion that functions as a beam that bends from lateral force SF, the first portion corresponding to the first structural portion 100, and ii) a second portion that functions as a beam that resists bending from lateral force SF, the second portion corresponding to the second structural portion 102. The first support member 110 prevents lateral force SF from being transmitted between the first and second structural portions 100 and 102 and the third structural portion 104.

As shown in FIG. 8, the second transmitting portion 122 is engaged with the second beam function portion 160. As a result, a second axial force F2 based on the lateral force SF acts on the second beam function portion 160 in a shearing direction thereof from the second transmitting portion 122. Accordingly, strain corresponding to the amount of lateral force SF is generated in the second beam function portion 160.

As shown in FIG. 2, similar to the longitudinal force detecting portion 130, it is also possible to consider the lateral force detecting portion 150 with the first and second structural portions 100 and 102 as constituting levers. These levers are constructed such that: i) the attachment point of the tire mounting bolts 60 and the first structural portion 100 is the fulcrum, ii) the contact point between the second transmitting portion 122 and the first structural portion 100 is the power point, and iii) the attachment point of the first support member 110 and the second structural portion 102 is the point of application. According to this principle of leverage, strain is generated in the strain gauges 154 and 156 which has been reduced in proportion to the amount of the second axial force F2.

Next, the construction, in principle, of the vertical force detecting portion that is within each detecting portion 90 and which is for detecting a vertical force VF on the tire 24 will be described.

Figure 9:
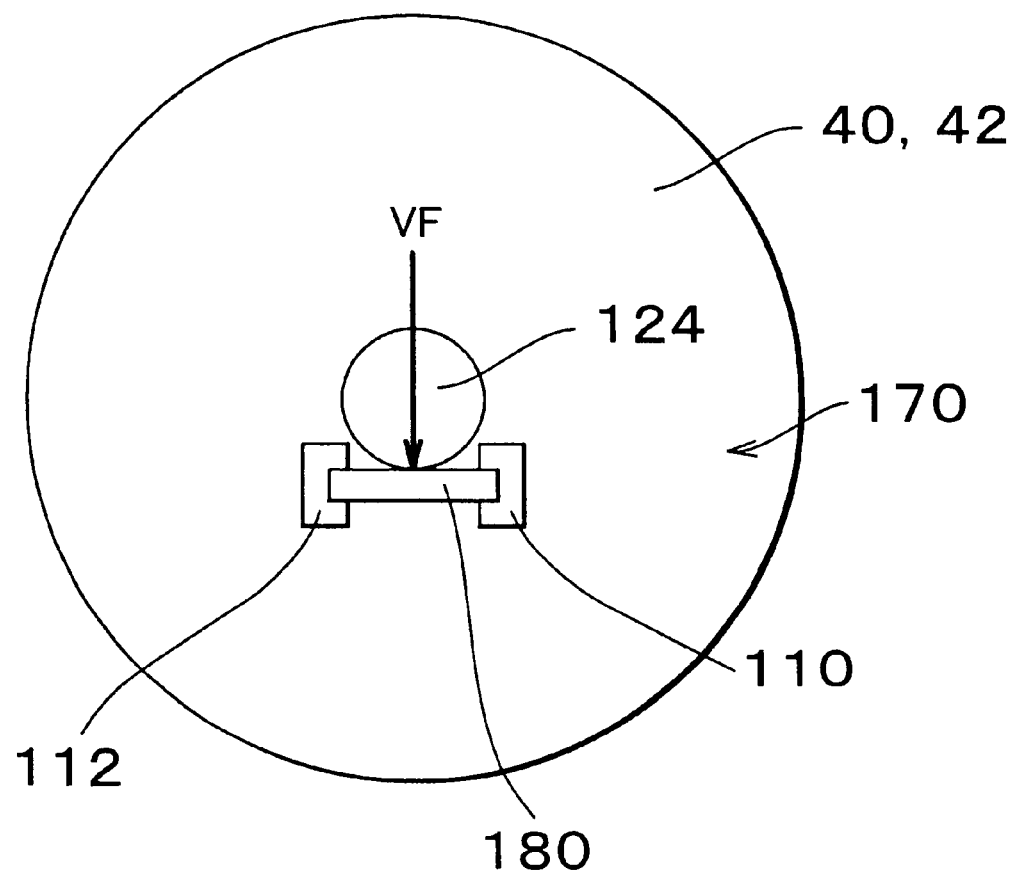
FIG. 9 is a front view schematically showing a vertical force detecting portion of a detector in FIG. 1, this vertical force detecting portion detecting vertical force on the tire.
Figure 10:
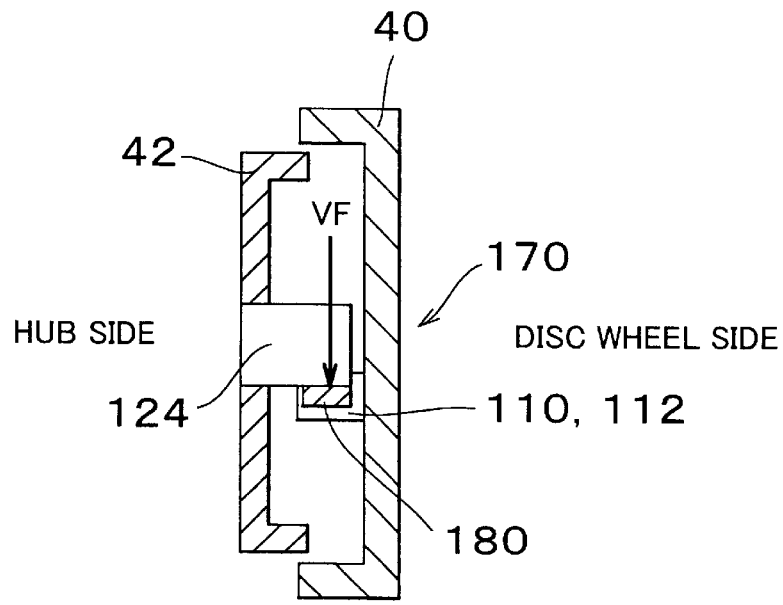
FIG. 10 is a side sectional view schematically showing the vertical force detecting portion in FIG. 9.

Referring back to FIG. 1, the third structural portion 104, the first and second support members 110 and 112, and a third transmitting portion 124 of each detecting portion 90 make up a vertical force detecting portion 170 (see FIGS. 9 and 10). The above various portions and members of the vertical force detecting portion 170 all work together to enable it to detect vertical force VF. The first support member 110 prevents vertical force from being transmitted between the first and second structural portions 100 and 102 and the third structural portion 104.

As shown in FIG. 1, when the third transmitting portion 124 is pushed against the detecting member 94, only the third structural portion 104 bends. This bending causes both opposing surfaces of the third structural portion 104 to strain in the direction of its thickness. A strain gauge 174 is attached to a surface of the third structural portion that is opposite the third transmitting portion 124. This strain gauge 174 converts the strain of that surface into an electrical signal. That is, the strain gauge 174 is attached to a surface of the third structural portion 104 in which tensile strain is generated by bending of the third transmitting portion 124 as a result of it being pushed.

Further, according to this exemplary embodiment, the detecting member 94 is formed so as to have three structural portions 100, 102 and 104 by bending a single, flat steel plate, as described above. Furthermore, a plurality of strain gauges 134, 136, 154, 156 and 174 is attached to each surface of the three structural portions 100, 102 and 104.

Therefore, according to this exemplary embodiment, it is possible to attach a plurality of strain gauges at selected locations on the surface of each flat plate before bending the flat plates, and then bending the flat plates with a pressing machine or the like to complete the detecting member 94.

However, according to this exemplary embodiment, both the longitudinal force detecting portion 130 and the lateral force detecting member 150 are constructed such that each of the transmitting portions 120 and 122 have two opposing portions which sandwich the detecting member 94, as shown in FIGS. 1 and 2. Those two portions transmit force to the detecting member 94 in respectively opposite directions. However, each portion only transmits force to the detecting member 94 in a single direction, which is the direction of compression. Therefore, compression force is generated when the portions push against the detecting member 94, but no tensile force is generated when the portions are separated from detecting member 94.

In contrast, according to this exemplary embodiment, the vertical force detecting portion 170 is constructed such that the third transmitting portion 124 thereof has only one portion that only transmits force to the detecting member 94 in one direction, which is the direction of compression. The four detecting portions 90 are made up of two pairs of two detecting portions 90, with the two detecting portions 90 in each pair opposing one another across the third transmitting portion 124. Accordingly, even if each detecting portion 90 is constructed so as to only detect compression force, by relying on the two detecting portions 90 that make up each pair, even if the direction in which the vertical force VF acts on the two detecting portions 90 changes, one of the two detecting portions 90 will detect the vertical force VF.

While the vehicle is running, the rotational position of each of the four detecting portions 90 around the detector axis changes because the disc wheel 22 rotates together with the hub 30. As a result, longitudinal force and lateral force are generated in each detecting portion 90 at all rotational positions, while vertical force is only generated in each detecting portion 90 at a limited number of rotational positions.

With regard to vertical force, more specifically, when only vertical force is transmitted from the third transmitting portion 124 to the third structural portion 104, each detecting portion 90 is able to detect vertical force only at a plurality of rotational positions within a range from 90 degrees in the clockwise direction to 90 degrees in the counterclockwise direction from a straight line in which the vertical force from the third transmitting portion 124 is transmitted to the third structural portion 104. In contrast, as described above, when the resultant force of vertical force and longitudinal force from the third transmitting portion 124 is transmitted to the third structural portion 104, each detecting portion 90 is able to detect the resultant force only at a plurality of rotational positions within a range from 90 degrees in the clockwise direction to 90 degrees in the counterclockwise direction from a straight line (a straight line that is slanted with respect to a straight line extending straight down from the third transmitting portion 124) in which the resultant force from the third transmitting portion 124 is transmitted to the third structural portion 104.

FIG. 9 and FIG. 10 schematically show a front view and a side sectional view, respectively, of the principle by which the vertical force detecting portion 170 detects vertical force VF. In these figures, reference numeral 180 denotes a third beam function portion that functions as a beam for detecting vertical force VF in the detecting portion 94. The third beam function portion 180 is supported at both ends by the first partition housing 40. The third beam function portion 180 has a portion that functions as a beam that bends when vertical force VF is applied, which corresponds to the third structural portion 104.

Referring to FIG. 9, the third transmitting portion 124 is engaged with the third beam function portion 180. As a result, vertical force VF from the third transmitting portion 124 acts on the third beam function portion 180 in the shearing direction thereof from the third transmitting portion 124. Accordingly, strain is generated in the third beam function portion 180 in accordance with the amount of vertical force VF.

Similar to the longitudinal force detecting portion 130 and the lateral force detecting portion 150 as shown in FIG. 1, it is also possible to consider of the vertical force detecting portion 170 with the third structural portion 104 as constituting a lever. This lever is constructed such that: i) the attachment point of the first support member 110 and the third structural portion 104 is the fulcrum, ii) the contact point between the third transmitting portion 124 and the third structural portion 104 is the power point, and iii) the attachment point of the second support member 112 and the third structural portion 104 is the point of application. According to this principle of leverage, strain is generated in the strain gauge 174 which has been reduced in proportion to the amount of the vertical force VF.

As is clear from the explanation above, according to this exemplary embodiment, the longitudinal force detecting portion 130, the lateral force detecting portion 150, and the vertical force detecting portion 170 are all designed such that strain, which has been mechanically reduced in proportion to the amount of load transmitted from each transmitting portion 120, 122 and 124 to the detecting member 94, is generated in each of the strain gauges 134, 136, 154, 156 and 174, which serve as detecting elements. As a result, the load capacity that each of the strain gauges 134, 136, 154, 156 and 174 must withstand is reduced.

That is, according to this exemplary embodiment, the lever formed by the detecting element 94 itself constitutes an example of the reducing mechanism.

According to this exemplary embodiment, a limiting function further reduces the load capacity of each strain gauge 134, 136, 154, 156 and 174. In this exemplary embodiment, this limiting mechanism is provided for the longitudinal force detecting portion 130 and the lateral force detecting portion 150.

Referring back to FIG. 1, a first limiting mechanism 190 for the longitudinal force detecting portion 130 is constructed so as to include a pair of stoppers 192 and 194 near the tire mounting bolt 60 in the second partition housing 42. One of the stoppers 192 functions when the vehicle moves forward. The other stopper 194 functions when the vehicle moves backward.

Before the first axial force F1, which is transmitted from the first transmitting portion 120 to the detecting member 94, exceeds a set limit, there is a clearance in the circumferential direction of the second partition housing 42 between each stopper 192 and 194 and the detecting member 94. As the first axial force F1 approaches the set limit, however, that clearance is reduced until the set limit is reached and there is no more clearance. When there is no more clearance, but the first axial force F1 is still being applied, that force is transmitted from the second partition housing 42 through one of the two stoppers 192 and 194, whichever corresponds, and the tire mounting bolt 60 to the first partition housing 40. As a result, the first axial force F1 transmitted to the detecting member 94 does not increase past the set limit. That is, the first axial force F1 increases in accordance with the rotational torque T when it is below the set limit, but if the first axial force F1 reaches the set limit, it is kept there.

A second limiting mechanism 200 for the lateral force detecting portion 150 is constructed so as to include a pair of stoppers 204 and 206 near the tire mounting bolt 60 in the first partition housing 40. One of the stoppers 204 functions when lateral force acts on the tire 24 in the direction of the outside of the turn. The other stopper 206 functions when lateral force acts on the tire 24 in the direction of the inside of the turn.

Before the lateral force SF, which is transmitted from the second transmitting portion 122 to the detecting member 94, exceeds a set limit, there is a clearance in the direction parallel to the detector axis between each stopper 204 and 206 and the detecting member 94. As the lateral force SF approaches the set limit, however, that clearance is reduced until the set limit is reached and there is no more clearance. When there is no more clearance, but lateral force SF is still being applied, that force is transmitted from the second partition housing 42 through one of the two stoppers 204 and 206, whichever corresponds, to the first partition housing 40. As a result, the second axial force F2 transmitted to the detecting member 94 does not increase past the set limit. That is, the second axial force F2 matches the lateral force SF when it is below the set limit, but if the second axial force F2 reaches the set limit, it is kept there.

As is clear from the explanation above, according to this exemplary embodiment, the first and second limiting mechanisms 190 and 200 both constitute examples of the limiting mechanism.

Further, the stopper 206 ultimately also functions to prevent the two partition housings 40 and 42 from separating from one another beyond a set limit in a direction parallel to the detector axis, i.e., in the lateral direction of the tire 24.

Figure 11:
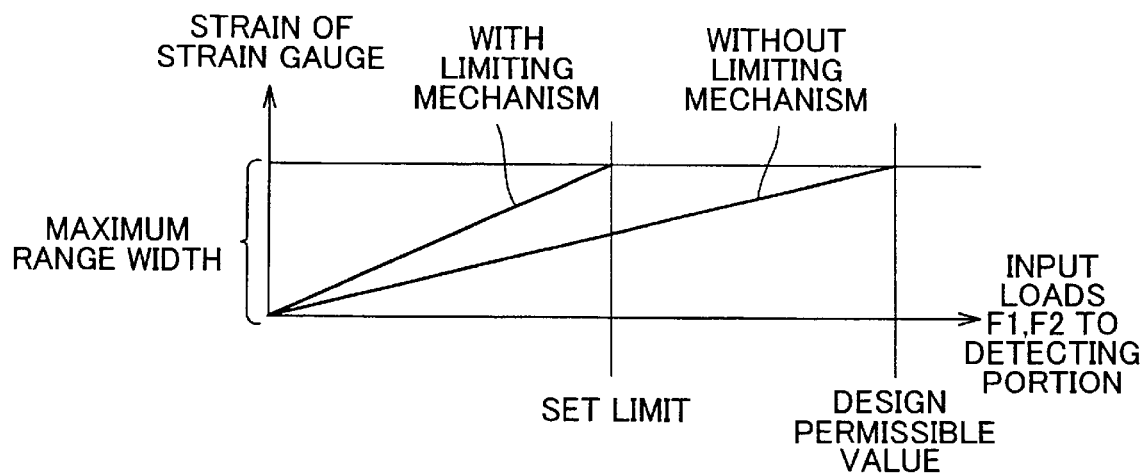
FIG. 11 is a graph showing a relationship between loads F1 and F2 input to each detecting portion in FIG. 1 and strain of a strain gauge in each detecting portion.

FIG. 11 is a graph showing a relationship between: i) input loads to the detecting portion 90, which are the first axial force F1 of the longitudinal force detecting portion 130 having a limiting mechanism and the second axial force F2 of the lateral force detecting portion 150 also having a limiting mechanism, and ii) strain generated in the strain gauges 134, 136, 154 and 156 in accordance with those input loads. A comparative example in which the limiting mechanisms are not provided is also shown in the figure.

When designing the detector 10, in order to allow a margin for safety for the load that is predicted to be generated when actually used, the design permissible value is generally set larger than the predicted load, similar to other ordinary devices. Also, the detector 10 is designed to clear that set design permissible value.

When the limiting mechanisms are not provided, the strain gauges 134, 136, 154 and 156 are used so that strain therein does not exceed its maximum range width when the input load matches the design permissible value.

Conversely, when the limiting mechanisms are provided, because the input load will not exceed the set limit, which is smaller than the design permissible value, the strain gauges 134, 136, 154 and 156 can be used so that strain thereof does not exceed its maximum range width when the input load matches that set limit.

Therefore according to this exemplary embodiment, the gradient of the graph in FIG. 11 is steeper when limiting mechanisms are provided for detecting longitudinal force and lateral force as compared to when they are not, which means that the detection sensitivity of the strain gauges 134, 136, 154 and 156 to longitudinal force and lateral force is very high.

Heretofore the mechanical configuration of the detector 10 was described. Next, the electrical configuration of the detector 10 will be described.

FIG. 12 is a block view schematically showing the electrical configuration of the detector 10. In this detector 10, The strain gauges 134, 136, 154, 156 and 174 are connected to a signal processing circuit 210. This signal processing circuit 210 is connected to a transmitter 214. The signal processing 210 picks out electrical signals indicative of the strain generated in the strain gauges 134, 136, 154, 156 and 174 and supplies them to the transmitter 214. The transmitter 214 then transmits the supplied electrical signals as electrical waves. The signal processing circuit 210 and the transmitter 214 operate with power supplied from a power source 216 provided in the detector 10. The power source 216 may be a consumption type which can not be recharged while in use, such as a direct current battery.

FIG. 12 is a block diagram that also schematically shows electrical equipment mounted on the vehicle body side of the vehicle. A receiver 220 is mounted on the vehicle body side in a position near the transmitter 214. A vehicle control unit 224 is connected to the receiver 220 via a signal processing unit 222. Signals sent from the transmitter 214 are received by the receiver 220 and supplied to the signal processing unit 222. The signal processing unit 222 then carries out the necessary processing of these signals and then supplies the processed signals to the vehicle control unit 224. The vehicle control unit 224 is constructed so as to include an actuator, not shown, for controlling the state of the vehicle, and a controller, also not shown, for driving the actuator as well as for controlling the driving state of the actuator.

The signal processing unit 222 includes a calculating portion 12 for calculating longitudinal force, lateral force and vertical force based on output signals from the detector 10. That is, according to this exemplary embodiment, the entire device for detecting force acting on a tire 24 is made up of a detector 10 provided between the disc wheel 22 and the hub 30, and the receiver 220 and the calculating portion 12 provided on the vehicle body side. The above detector 10, the receiver 220, and the calculating portion 12 all work together to enable the device to detect force acting on the tire 24.

According to this exemplary embodiment, the calculating portion 12 provided on the vehicle body side calculates force acting on the tire based on the output signals from the strain gauges 134, 136, 154, 156 and 174, regardless of whether the force acting on the tire to be detected is longitudinal force, lateral force, or vertical force.

As described previously, longitudinal force and lateral force are generated in each detecting portion 90 at all rotational positions, while vertical force is only generated in each detecting portion 90 at a limited number of rotational positions.

Figure 13:
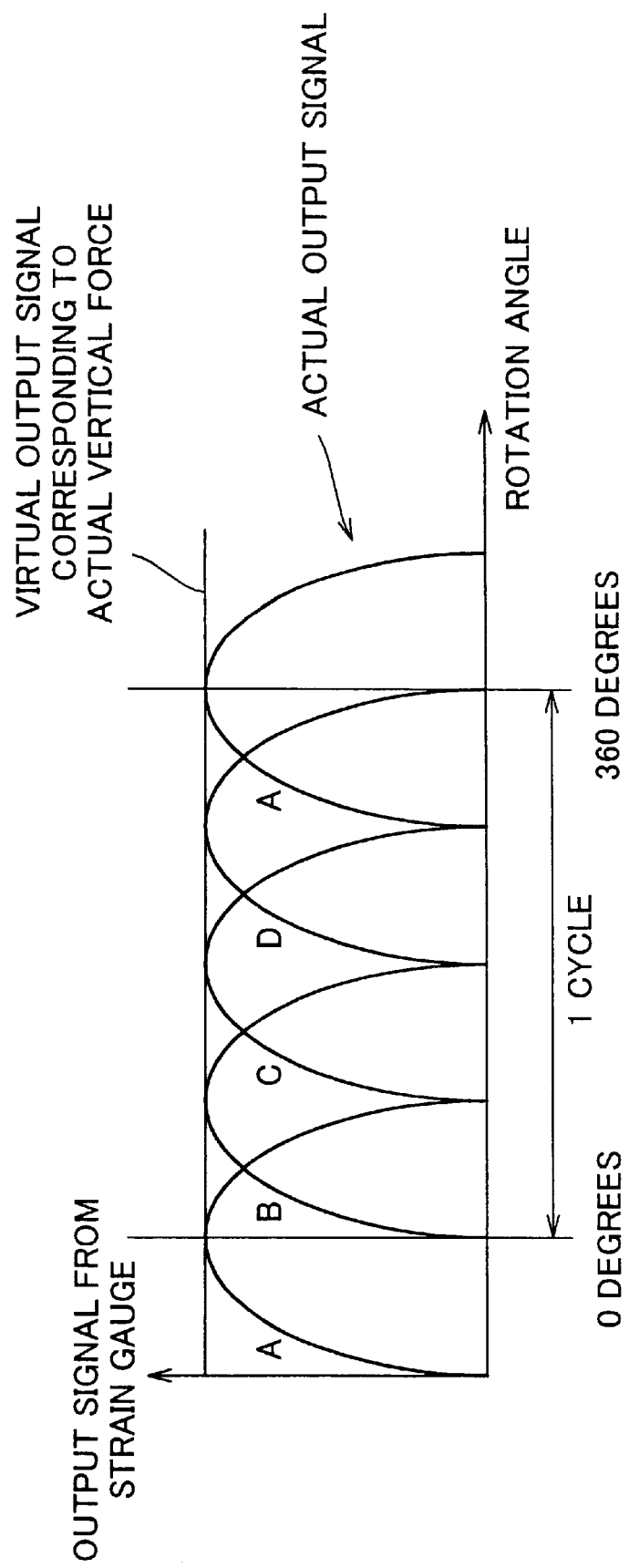
FIG. 13 is a graph showing the change in an output signal from the strain gauge of each detecting portion in FIG. 1 together with the change in rotation angle of the detector in the same figure.

FIG. 13 is a graph showing, with a plurality of individual curves, the change in an output signal from each strain gauge 174 in the third structural portion 104 of the four detecting portions 90 positioned in four rotational locations at 90 degree intervals, along with the change in rotation angle of the detector 10. As is apparent from FIG. 13, the size of the component of the vertical force VF acting at a right angle to each strain gauge 174 changes cyclically in accordance with the rotational position of each detecting portion 90, i.e., in accordance with the rotation angle of the tire 24, regardless of the fact that the amount of actual vertical force VF does not change over time.

This cyclic change appears as a cyclic change in the output signal of each strain gauge 174.

FIG. 13 is a graph in which the virtual output signal corresponding to the actual vertical force VF is a horizontal, straight line. As is evident from the graph in this figure, the output signal of each strain gauge 174 is indicated by a single curve expressed with an upwardly convex sine wave for each cycle, i.e., for every one rotation of the tire 24. The maximum value in each individual curve matches the virtual output signal corresponding to the actual vertical force VF.

According to this exemplary embodiment, any two adjacent detecting portions 90 are positioned at 90 degrees from one another around the detector axis. As a result, any two adjacent third structural portions 104 together form a right angle as shown in FIG. 1. The cylindrical surface of the third transmitting portion 124 contacts both of the two third structural portions 104.

Accordingly, when vertical force VF acts straight down from the third transmitting portion 124 and one of the two third structural portions 104 is positioned directly below the third transmitting portion 124, force from the third transmitting portion 124 is transmitted only to that third structural portion 104. However, as that third structural portion 104 is rotated from the position directly below the third transmitting portion 124, the third transmitting portion 124 also transmits force to the other third structural portion 104. In this state, the actual vertical force VF is distributed to the two third structural portions 104. Then, if force transmitted in a perpendicular direction from the third transmitting portion 124 to the surface of each third structural portion 104 is expressed as component forces f1 and f2, then the actual vertical force VF is expressed by the square root of the square of sums of component force f1 and component force f2.

Meanwhile, when force is being transmitted from the third transmitting portion 124 to the two third structural portions 104, force is not being transmitted from the third transmitting portion 124 to the remaining two of the four third structural portions 104. However, as rotation continues, force is transmitted from the third transmitting portion 124 to one of the first two third structural portions 104 and an adjacent one of the remaining two third structural portions 104, just as it was with the first two third structural portions 104.

As is clear from the fact that this type of shift in the force transmitting state is repeated as the detector 10 rotates, vertical force VF can ultimately be calculated without relying on the rotational position of the detector 10 by using the square root of the sum of squares of the output signal from each strain gauge 174 of the four detecting portions 90.

As shown in FIG. 1, according to this exemplary embodiment, both longitudinal force and vertical force act on the second partition housing 42. As a result, when both of those forces are also acting on the third transmitting portion 124, they are transmitted through the third transmitting portion 124 to the third structural portion 104. Not only vertical force but also longitudinal force is ultimately transmitted to the third structural portion 104 because while the direction of lateral force does not contribute to the bending of the third structural portion 104, the direction of longitudinal force and vertical force does contribute to the bending of the third structural portion 104.

Figure 14:
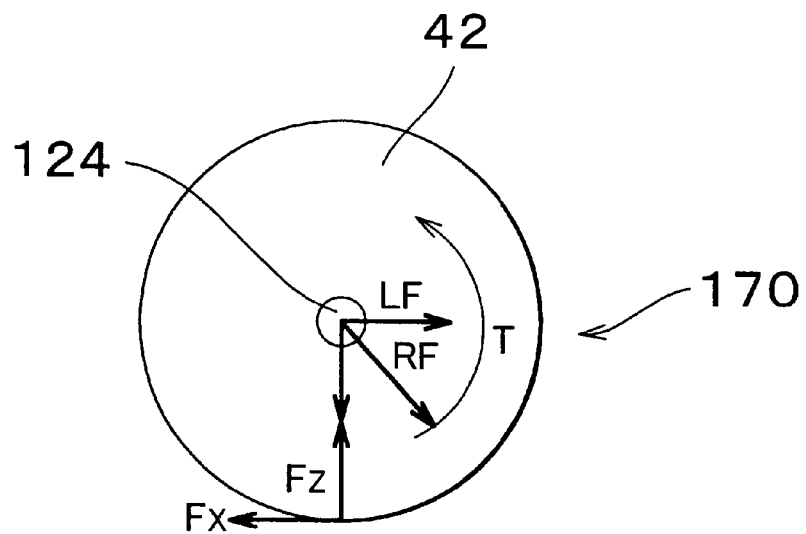
FIG. 14 is a front view for explaining the types of force acting on the strain gauge in the vertical force detecting portion in FIG. 9.

Therefore, according to this exemplary embodiment, resultant force RF of the longitudinal force LF and the vertical force VF acts on each of the third structural portions 104, as shown in FIG. 14. As a result, the output signal from the strain gauge 174 of the third structural portion 104 ultimately indicates the resultant force RF, not the vertical force VF. That is, the output signal ultimately includes not only the component that reflects vertical force, but also the component which reflects longitudinal force.

Therefore, according to this exemplary embodiment, the component that reflects longitudinal force is eliminated from the output signal of the strain gauge 174 of the third structural portion 104 in the calculating portion 12.

More specifically, the calculating portion 12 first calculates the square of the resultant force of the longitudinal force and the vertical force based on the raw output signal from the strain gauge 174 of each of the third structural portions 104 in the four detecting portions 90. This calculation is performed using the sum of squares of the output signals of the four strain gauges 174, as described above. Next, the calculation portion 12 calculates the longitudinal force based on the output signals from the strain gauges 154 and 156 of the second structural portion 102. Then, the calculation portion 12 calculates from the square of the calculated resultant force the vertical force as the square root of a value from which the square of the calculated longitudinal force was subtracted.

Further, according to this exemplary embodiment, the detecting member 94 is constructed such that the first through third structural portions 100, 102 and 104 are formed integrally together. However, the detecting member 94 can also be constructed such that one of those structural portions can be separated from the remaining two structural portions. This embodiment makes it easy to prevent a specific type of force acting on the tire from being transmitted between the two separated portions, for example. Then, for example, the third structural portion 104 is selected for one structural portion and the first and second structural portions 100 and 102 are selected for the remaining two structural portions.

Next a second embodiment of the invention will be described. This exemplary embodiment has many elements that are the same as those in the first exemplary embodiment. The only element that is different relates to the construction for applying the preload to the third structural portion 104. Therefore, only this element will be described in detail. Elements in the second exemplary embodiment that are the same as those in the first exemplary embodiment are referred to by the same terminology and reference numerals as in the first exemplary embodiment, and explanations thereof will therefore be omitted.

According to the first exemplary embodiment, the preload is applied to the strain gauges 154 and 156 for detecting lateral force by the coil spring 80, as described above. In the second exemplary embodiment, however, the preload is also applied to the strain gauge 174 for detecting vertical force.

Figure 15:
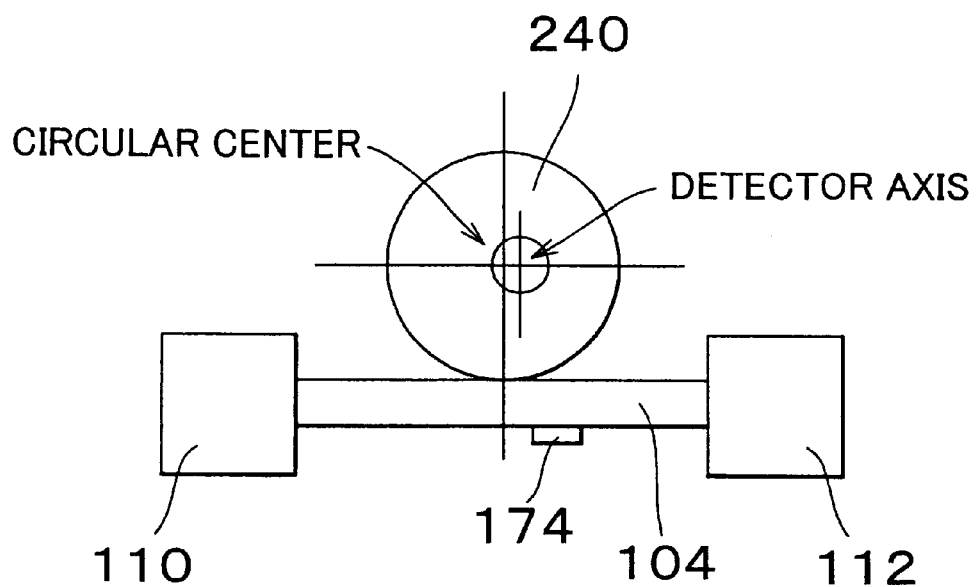
FIG. 15 is a front view showing a principle of the vertical force detecting portion of the detector in a device for detecting force acting on a tire according to a second embodiment of the invention.

According to the second exemplary embodiment, the relative position of the strain gauge 174 for detecting vertical force and the third transmitting portion 124 is regulated such that the third transmitting portion 124 presses against the strain gauge 174 even when the vertical force is 0, as shown in FIG. 15. The third transmitting portion 240 applies the preload to the strain gauge 174 because of this type of regulated relative position.

Further, according to this exemplary embodiment, the amount of that applied preload can be adjusted by the manufacturer when the detector 10 is being assembled.

In order to apply these technologies, in this exemplary embodiment, a third transmitting portion 240 having a completely cylindrical surface that is engaged with the third structural portion 104 is arranged eccentrically with respect to the detector axis, as shown in FIG. 15. The third transmitting portion 240 can rotate around the detector axis.

Therefore, according to this exemplary embodiment, the amount of preload applied to the third structural portion 104 and the strain gauge 174 thereof is able to be adjusted by adjusting the rotation angle of the third transmitting portion 240 around the detector axis, regardless of any variations that occur during manufacturing of the third transmitting portion 240 and the third structural portion 104 and the like.

According to this exemplary embodiment, the four third structural portions 104 are disposed around the third transmitting portion 240. It is preferable that preload applied to any of the structural portions 104 be adjustable by the third transmitting portion 240.

Figure 16:
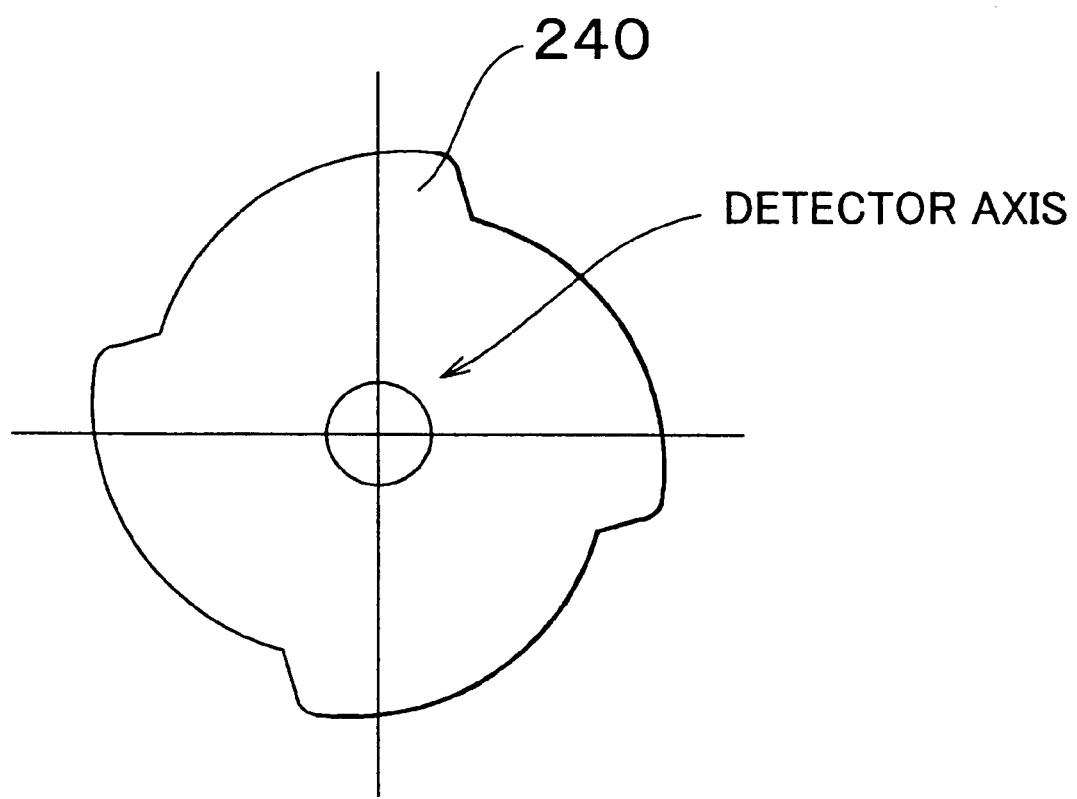
FIG. 16 is a front view showing a third transmitting portion in FIG. 15.

Therefore, according to this exemplary embodiment, an engaging surface of any one of the third transmitting portions 240 that is engaged with the four third structural portions 104 is formed by combining four partially cylindrical surface of the same diameter that are offset by the same amount in different directions at 90 degree intervals with respect to the detector axis, as shown in FIG. 16. When the third transmitting portion 240 which has this type of engaging surface is rotated around the detector axis, the preload applied to all of the third structural portions 104 and the strain gauges 174 thereof changes simultaneously by the same amount in the same direction in accordance with that rotation angle.

That is, according to the exemplary embodiment, the third transmitting portion 240 is an example of the preload applying mechanism, and is also an example of the position regulating mechanism.

Next, a third exemplary embodiment of the invention will be described. This exemplary embodiment has many elements that are the same as those in the first exemplary embodiment. The only elements that are different relate to the construction of the longitudinal force detecting portion and the lateral force detecting portion. Therefore, only these elements will be described in detail. Elements in the third exemplary embodiment that are the same as those in the first exemplary embodiment are referred to by the same terminology and reference numerals as in the first exemplary embodiment, and explanations thereof will therefore be omitted.

In the first exemplary embodiment, the longitudinal force detecting portion 130 is designed so as to use different strain gauges 134 and 136 when driving force is applied to the tire 24 while the vehicle is moving forward or when braking force is applied to the tire 24 while the vehicle is moving backward, than when braking force is applied to the tire 24 while the vehicle is moving forward or when driving force is applied to the tire 24 while the vehicle is moving backward, as described above.

Furthermore, in the first exemplary embodiment, the lateral force detecting portion 150 is designed so as to use different strain gauges 154 and 156 when lateral force is applied to the tire 24 toward the outside of the turn, than when lateral force is applied to the tire 24 toward the inside of the turn.

Therefore, according to the first exemplary embodiment, the strain gauges 134, 136, 154 and 156 are mounted on both sides of the first and second structural portions 100 and 102, respectively.

Figure 17:
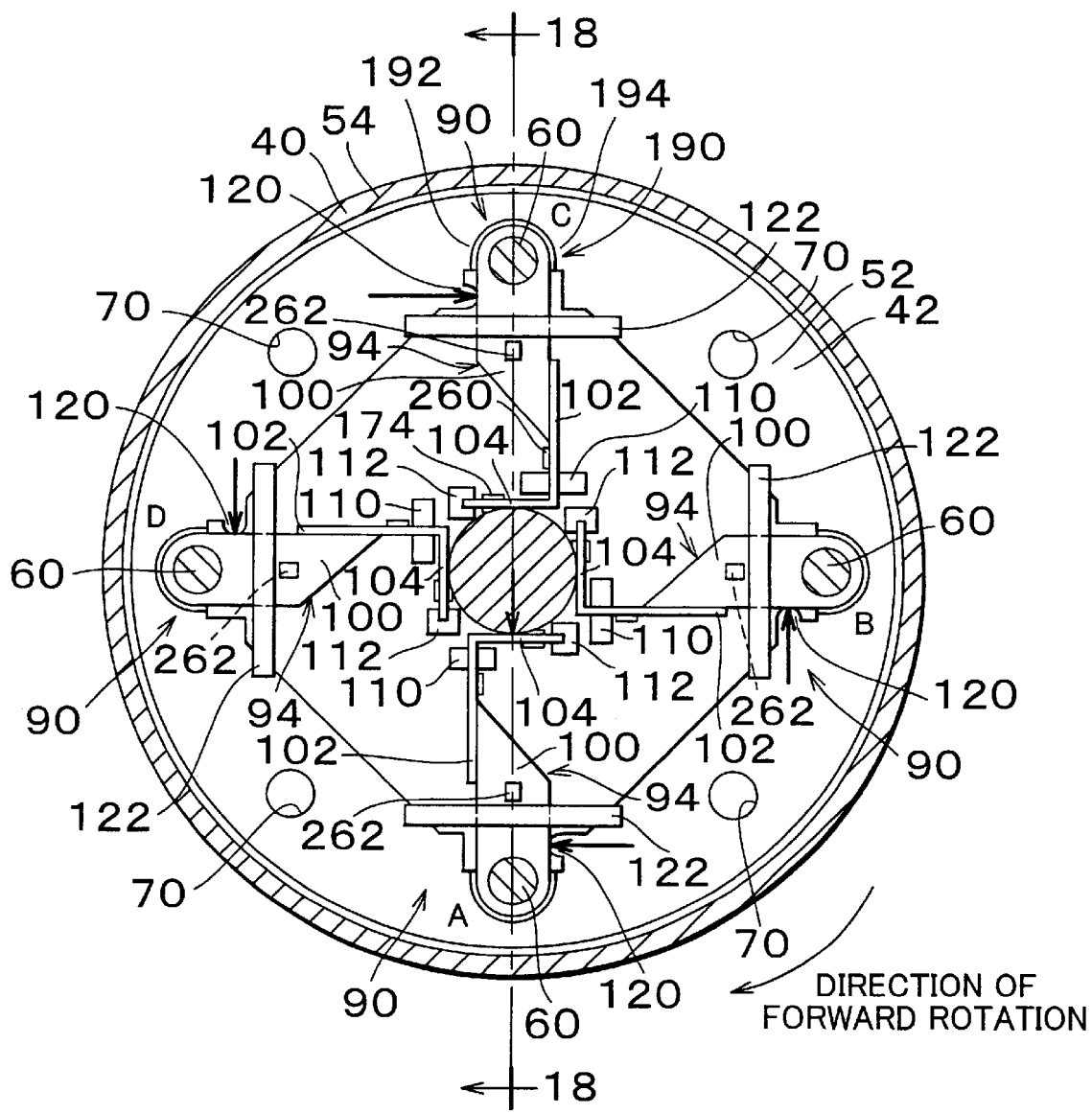
FIG. 17 is a front view showing an internal construction of the detector of a device for detecting force acting on a tire according to a third embodiment of the invention.
Figure 18:
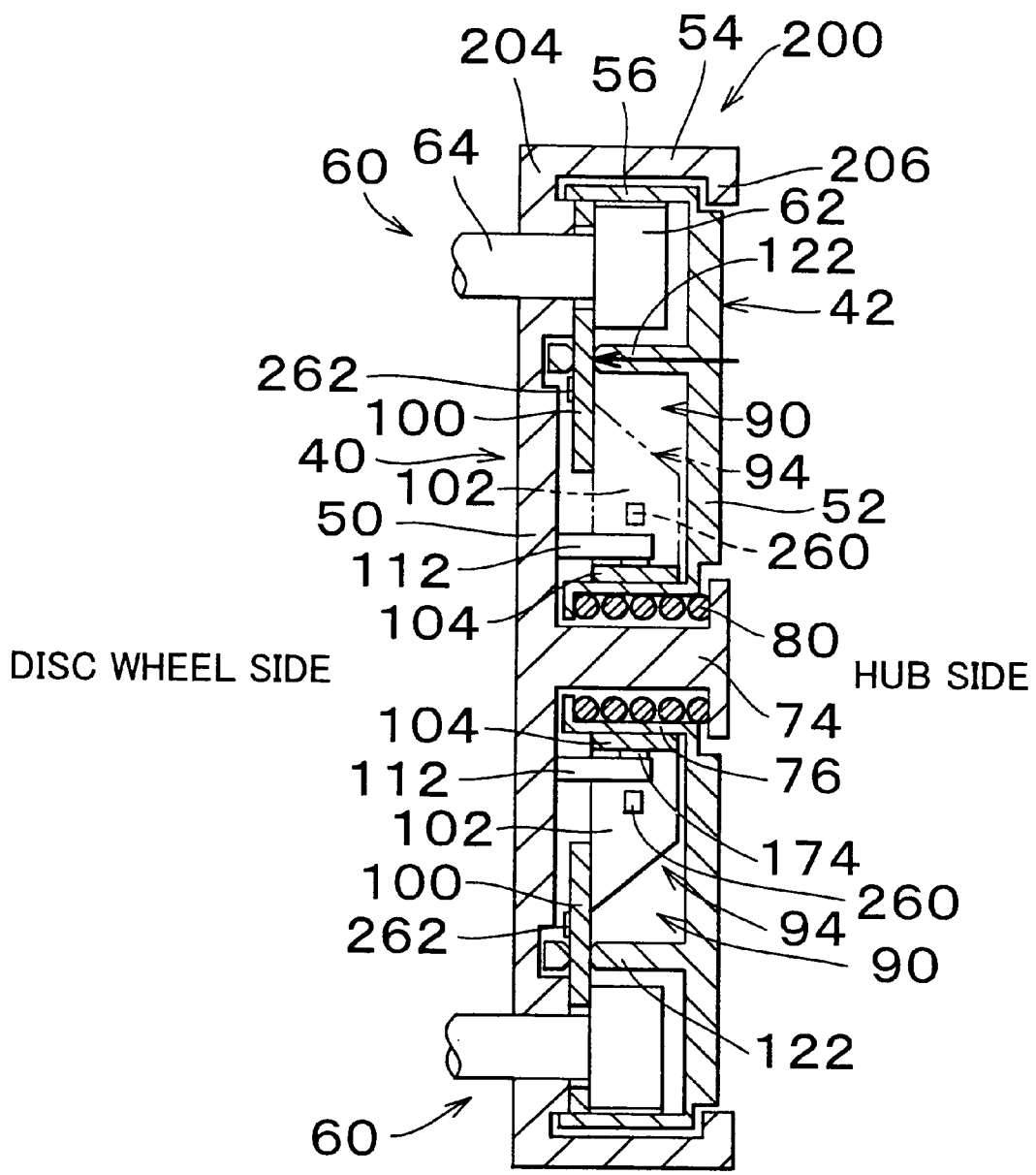
FIG. 18 is a sectional view taken along line 18—18 in FIG. 17.

In contrast, according to the third exemplary embodiment, a strain gauge 260 for detecting longitudinal force, a strain gauge 262 for detecting lateral force, and the strain gauge 174 for detecting vertical force are mounted on one side of the flat plate of each detecting portion 90 before that flat plate is bent to form the detecting member 94, as shown in FIG. 17 and FIG. 18.

Also according to this exemplary embodiment, it is presumed that each of the strain gauges 260, 262 and 174 detects the necessary force acting on the tire based on tensile strain generated in each of those strain gauges, just as in the first exemplary embodiment.

Then, as shown in the chart in FIG. 19, in this exemplary embodiment the detecting portion 90 labeled A in FIG. 17: i) detects driving force when the vehicle is moving forward, ii) detects braking force when the vehicle is moving backward, and iii) detects lateral force when lateral force is acting on the tire 24 toward the outside of the turn.

The detecting portion 90 labeled B is disposed in a position offset 90 degrees from the detecting portion 90 labeled A in the direction opposite forward rotation. The detecting portion 90 labeled B: i) detects driving force when the vehicle is moving backward, ii) detects braking force when the vehicle is moving forward, and iii) detects lateral force when lateral force is acting on the tire 24 toward the inside of the turn.

The detecting portion 90 labeled C is disposed in a position offset 90 degrees from the detecting portion 90 labeled B in the direction opposite forward rotation. The detecting portion 90 labeled C: i) detects driving force when the vehicle is moving forward, ii) detects braking force when the vehicle is moving backward, and iii) detects lateral force when lateral force is acting on the tire 24 toward the outside of the turn.

The detecting portion 90 labeled D is disposed in a position offset 90 degrees from the detecting portion 90 labeled C in the direction opposite forward rotation. The detecting portion 90 labeled D: i) detects driving force when the vehicle is moving backward, ii) detects braking force when the vehicle is moving forward, and iii) detects lateral force when lateral force is acting on the tire 24 toward the inside of the turn.

Next a fourth exemplary embodiment of the invention will be described. This exemplary embodiment has many elements that are the same as those in the first exemplary embodiment. The only element that is different relates to the construction of the detecting portion. Therefore, only this element will be described in detail. Elements in the fourth exemplary embodiment that are the same as those in the first exemplary embodiment are referred to by the same terminology and reference numerals as in the first exemplary embodiment, and explanations thereof will therefore be omitted.

In the first exemplary embodiment, the detecting member 94, formed as an independent member, is mounted to the two partition housings 40 and 42 not in a rigid state, but in a state permitting relative movement.

Figure 20:
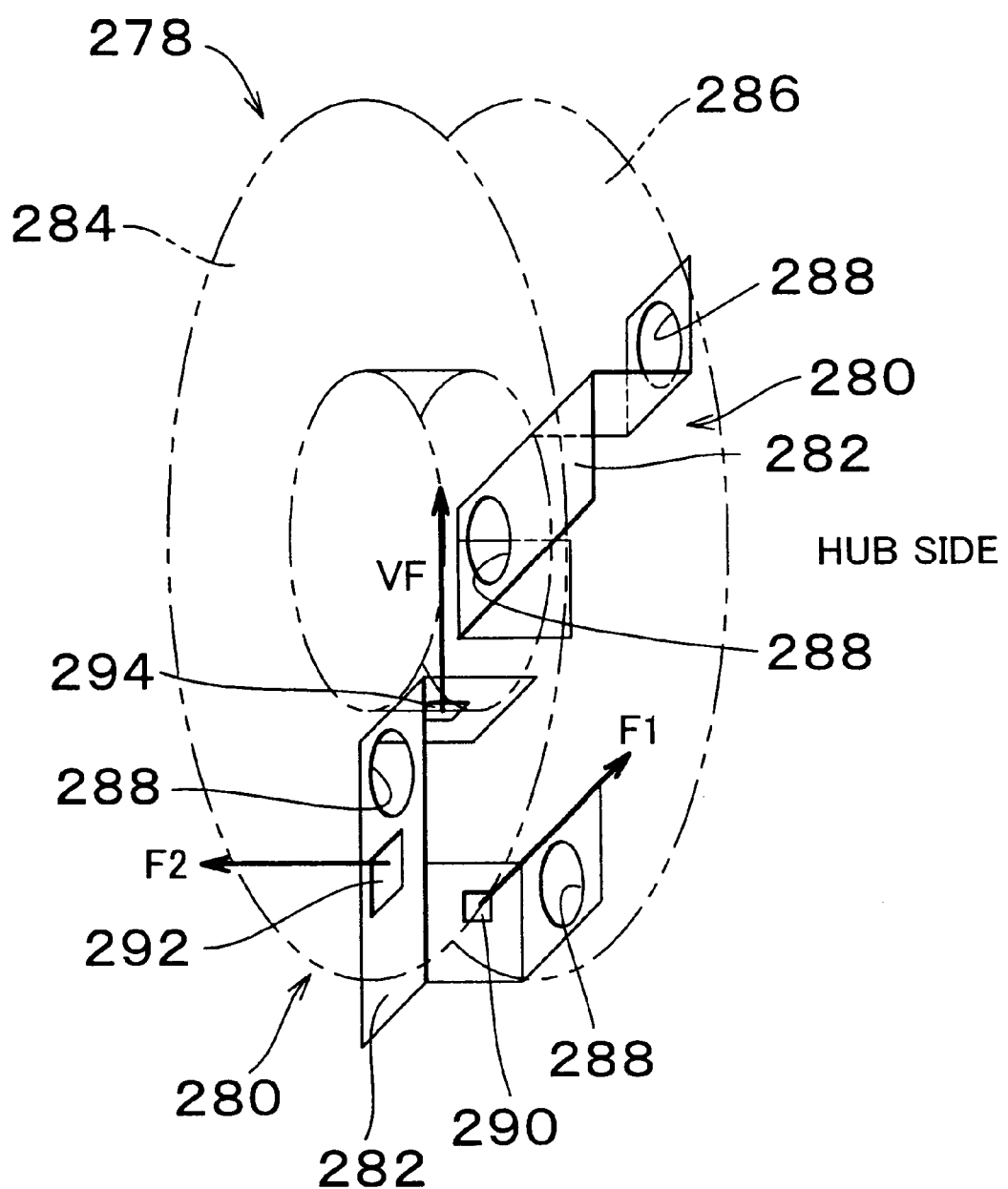
FIG. 20 is a perspective view showing a principle of part of the construction of the detector of a device for detecting force acting on a tire according to a fourth embodiment of the invention.
Figure 21:
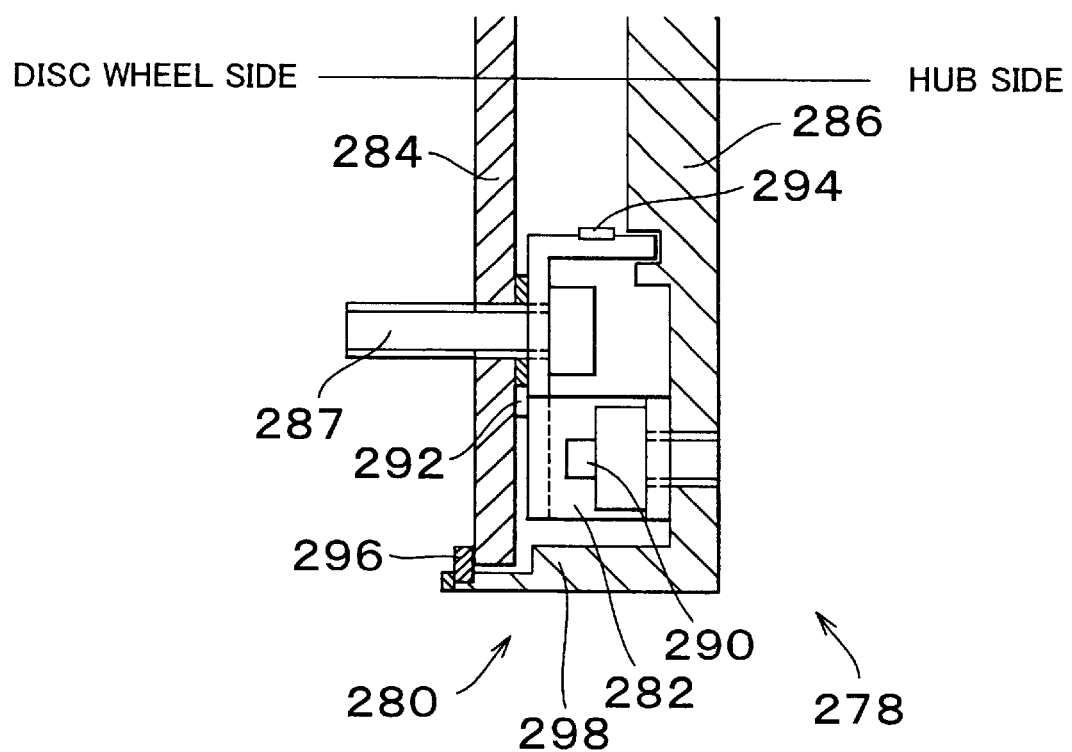
FIG. 21 is a partial sectional side view showing an example of a detecting member used to connect a first partition housing and a second partition housing together.

In contrast, according to the fourth exemplary embodiment, a detecting member 282 in each detecting portion 280 is mounted in two partition housings 284 and 286 and is a rigid state within a detector 278, as shown schematically in the perspective view of FIG. 20. In this figure, however, only two of the four detecting portions 280 disposed at evenly spaced intervals around the detector axis are shown representatively. The first partition housing 284 is mounted to a disc wheel 22, not shown, with a tire mounting bolt 287, as shown in FIG. 21. The second partition housing 286 is mounted to the hub 30, not shown, with a hub mounting bolt, also not shown.

Referring to FIG. 21, each detecting member 282 is fastened to the two partition housings 284 and 286 with two bolts which serve as fastening means. In FIG. 20, an oval drawn within each detecting member 282 represents a through-hole 288 in each detecting member 282 through which the two bolts pass. One of the two bolts is a tire mounting bolt 287 which is used to both attach the detector 278 to the disc wheel 22 and attach each detecting member 282 to the first partition housing 284.

The detecting member 282 is less rigid than the two partition housings 284 and 286. As a result, relative displacement of the two partition housings 284 and 286 is permitted by elastic deformation of the detecting member 282.

A strain gauge 290 for detecting longitudinal force, a strain gauge 292 for detecting lateral force, and a strain gauge 294 for detecting vertical force are mounted to only one surface of the detecting member 282, just as in the third exemplary embodiment.

As shown in FIG. 21, a pair of stoppers 296 and 298 which sandwich the first partition housing 284 from both sides is provided on the second partition housing 286. This pair of stoppers 296 and 298 selectively abut against a corresponding one of two surfaces of the first partition housing 284. This abutting prevents the second axial force F2 (see FIG. 20) from the two partition housings 284 and 286 which acts in both directions parallel to the detector axis, from exceeding a set limit and acting on the detecting members 282.

Further, the stopper 296 also serves to prevent the first partition housing 284 from separating from the second partition housing 286 on the same axis.

Next a fifth exemplary embodiment of the invention will be described. This exemplary embodiment has many elements that are the same as those in the first exemplary embodiment. The only element that is different relates to the arrangement of the detecting portion. Therefore, only this element will be described in detail. Elements in the fifth exemplary embodiment that are the same as those in the first exemplary embodiment are referred to by the same terminology and reference numerals as in the first exemplary embodiment, and explanations thereof will therefore be omitted.

In the first exemplary embodiment, there are four of the detecting portions 90. According to the fifth exemplary embodiment, however, there are only two. In the detector according to this exemplary embodiment, the two detecting portions 90 are the detecting portion 90 labeled A in FIG. 1 and the detecting portion 90 labeled C in FIG. 1.

With respect to detection of longitudinal force and lateral force, even when there are less than four detecting portions, output signals from each of the strain gauges 134, 136, 154 and 156 reflect longitudinal force and lateral force, respectively, regardless of the rotation angle of the detector.

In contrast, with respect to vertical force, when there are less than four detecting portions 90, the output signals from the strain gauges 174 change cyclically as the rotation angle of the detector changes, even when the amount of actual vertical force does not change over time. Furthermore, for each strain gauge 174, there is a rotational position at which the output signals from the strain gauges 174 do not reflect the amount of actual vertical force at all.

Figure 22:
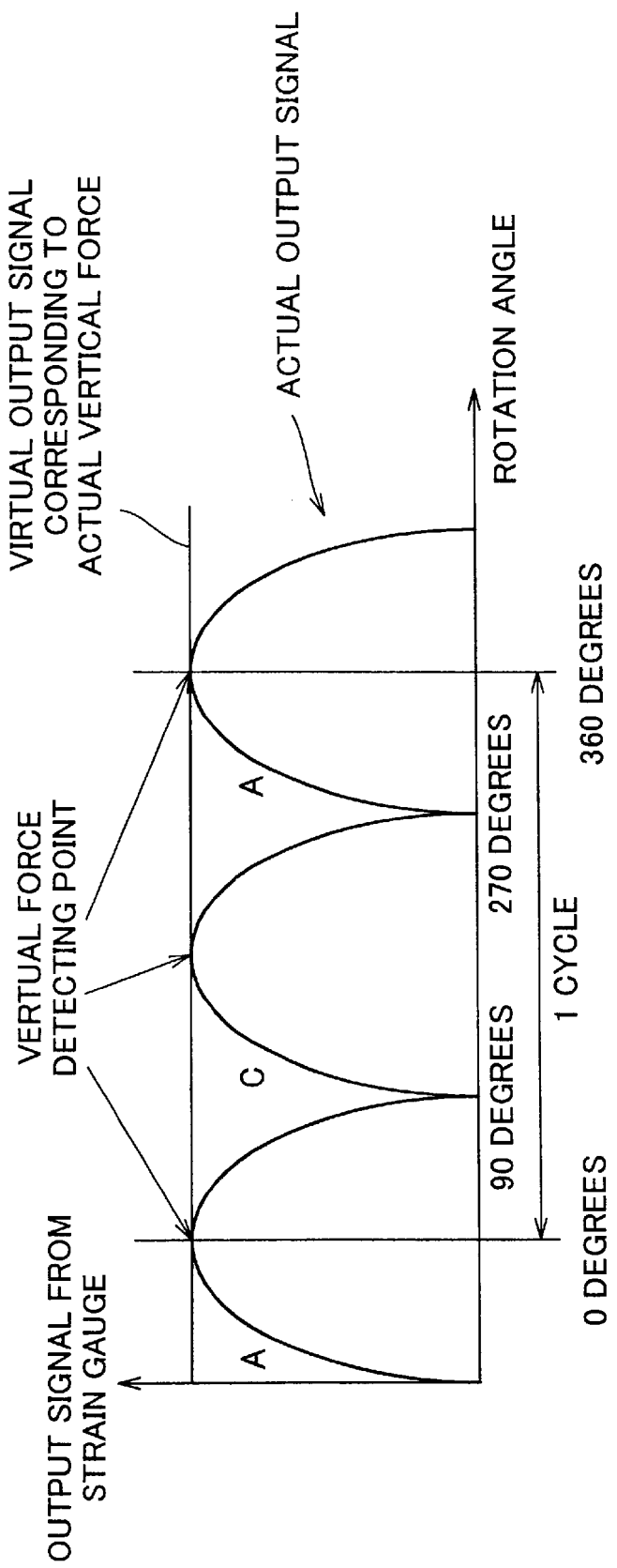
FIG. 22 is a graph showing the change in the output signal from the strain gauge of the detector in a device for detecting force acting on a tire according to a fifth embodiment of the invention, together with the change in rotation angle of the detector.

FIG. 22 is a graph showing, with a plurality of individual curves, the change in an output signal from each strain gauge 174 in the two detecting portions 90 along with the change in rotation angle of the detector when the amount of actual vertical force does not change over time. In each individual curve, the maximum value faithfully reflects the amount of actual vertical force, as described above. When the rotation angle of the detector that corresponds to the maximum value in any one individual curve is set at 0 degrees, the output signal from the strain gauge 174 in each detecting portion 90 will be 0 at two rotational positions in which relative rotation angles that express a distance from that 0 degree rotation angle are 90 degrees and 270 degrees.

According to this exemplary embodiment, the calculating portion 12 provided on the vehicle body side sequentially calculates vertical force based on each output signal from the two strain gauges 174 for detecting vertical force, while taking the above characteristics into consideration.

More specifically, the calculating portion 12 calculates vertical force as temporary vertical force, just as in the first exemplary embodiment, based on the output signals from each strain gauge 174 for every calculation cycle. Next, the calculating portion 12 corrects the calculated temporary vertical force using the relative rotation angle $\theta$ in that calculation cycle to obtain the final vertical force.

The temporary vertical force can be corrected as follows, for example.

When the correction is performed based on the detecting portion 90 labeled A, the rotational position of the detector when the output signal from the strain gauge 174 of that reference detecting portion 90 indicates the maximum value is set as the reference rotational position. The relative rotation angle $\theta$ is calculated from that reference rotational position.

A vehicle wheel rotation angle sensor, not shown, for detecting the relative rotation angle $\theta$ of each vehicle wheel 20 is also mounted in a vehicle that is equipped with the device for detecting force acting on a tire according to this exemplary embodiment. According to this exemplary embodiment, the relative rotation angle $\theta$ is then calculated based on the output signal from that vehicle wheel rotation angle sensor.

Thus, when the calculated relative rotation angle $\theta$ is greater than 0 degrees but less than 90 degrees and the temporary vertical force obtained by the detecting portion 90 labeled A is denoted as PVA and the final vertical force is denoted as FV, the temporary vertical force PVA can be corrected with a calculation according to Expression 1 below.

$$FV = PVA/\cos\theta \qquad \text{Expression 1:}$$

When the relative rotation angle $\theta$ is greater than 90 degrees but less than 180 degrees and the temporary vertical force obtained by the detecting portion 90 labeled C is denoted as PVC, the temporary vertical force PVC can be corrected with a calculation according to Expression 2 below.

$$FV = PVC/\cos\theta \qquad \text{Expression 2:}$$

When the relative rotation angle $\theta$ is greater than 180 degrees but less than 270 degrees, the temporary vertical force PVC can still be corrected with a calculation according to Expression 2 above.

When the relative rotation angle $\theta$ is greater than 270 degrees but less than 360 degrees, the temporary vertical force PVA can be corrected with a calculation according to Expression 1 above.

However, when the relative rotation angle $\theta$ is 0 degrees, the temporary vertical force PVA is calculated as it is as the final vertical force FV, and when the relative rotation angle $\theta$ is 180 degrees, the temporary vertical force PVC is calculated as it is as the final vertical force FV.

Furthermore, when the relative rotation angle $\theta$ is 90 degrees or 270 degrees, the temporary vertical force PVA at that time is 0 and correction by dividing by $\cos\theta$ is not possible. Therefore in this case, calculation of the final vertical force FV is not actually performed and the final vertical force FV calculated near 90 degrees or 270 degrees, for example, is used instead.

Moreover according to this exemplary embodiment, the final vertical force FV is obtained also at a relative rotation angle $\theta$ other than the relative rotation angle $\theta$ that indicates the temporary vertical forces PVA and PVC as the maximum values. However, this invention can also be carried out according to an embodiment in which the final vertical force FV is obtained only at the relative rotation angle θ that indicates the temporary vertical forces PVA and PVC as the maximum values.

According to this embodiment of the invention, there are cases where it is necessary to obtain the final vertical force as the maximum value of the temporary vertical force by relating the output signals from each of the strain gauges 174 for every cycle. In these cases, when a new cycle starts each time the output signal changes from 0 to a value other than 0, for example, it is possible to obtain the final vertical force as the maximum force of a temporary vertical force in a given cycle in a period from when the maximum value of the temporary vertical force is obtained in that cycle until that same cycle ends. In this case, it is possible to make the final vertical force obtained in the most recent cycle invalid as the next cycle starts. It is also possible to make the final vertical force obtained in the most recent cycle valid until the temporary vertical force in the current cycle becomes the maximum value.

Moreover, a method for calculating vertical force when there are two detecting portions 90 was described above. However, the invention can also be carried out when there is only one detecting portion 90 by calculating vertical force according to a method based on the aforementioned method.

Next a sixth exemplary embodiment of the invention will be described. Elements in the sixth exemplary embodiment that are the same as those in the first exemplary embodiment are referred to by the same terminology and reference numerals as in the first exemplary embodiment so detailed explanations thereof will therefore be omitted.

The following points of the device for detecting force acting on a tire according to the sixth exemplary embodiment are the same as those for the first exemplary embodiment: i) the detector can be detachably mounted between the disc wheel 22 and the hub 30 in a state in which force is being transmitted therebetween, ii) the detector and the calculating portion 12 that is able to communicate wirelessly are provided on the vehicle body side, and iii) the detecting portion which has a detecting element is disposed in an interior space enclosed by the two partition housings that fit together so as to be relatively displaceable.

However, the device for detecting force acting on a tire according to the sixth exemplary embodiment differs from the device of the first exemplary embodiment in that the device according to the sixth exemplary embodiment only detects longitudinal force and lateral force, while the device according the first exemplary embodiment detects not only longitudinal force and lateral force, but also vertical force.

Further, the device for detecting force acting on a tire according to the sixth exemplary embodiment also differs from the device of the first exemplary embodiment in that the device according to the sixth exemplary embodiment transmits rotational torque T between the two partition housings to the detecting element through a combination of a gear mechanism and a screw mechanism connected together in series, while the device according the first exemplary embodiment transmits rotational torque T between the two partition housings to the detecting element using a detecting member 94 which functions as a beam.

Moreover, the device for detecting force acting on a tire according to the sixth exemplary embodiment also differs from the device of the first exemplary embodiment in that the device according to the sixth exemplary embodiment directly detects lateral force SF between the two partition housings, while the device according the first exemplary embodiment indirectly detects lateral force SF between the two partition housings through the detecting member 94 which functions as a beam.

Figure 23:
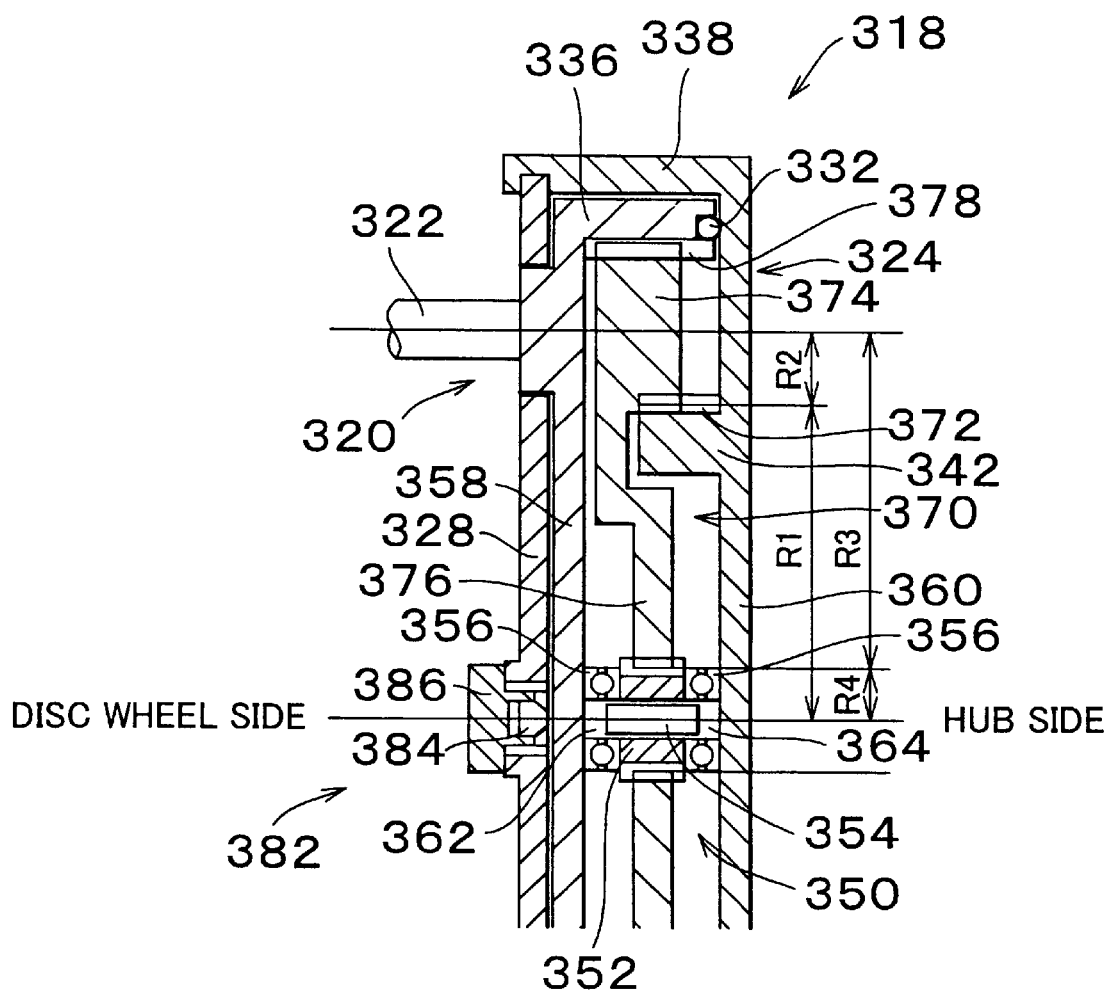
FIG. 23 is a partial sectional side view showing a main portion of a detector of a device for detecting force acting on a tire according to a sixth embodiment of the invention.

Referring to FIG. 23, in a detector 318 according to this exemplary embodiment, a plurality of tire mounting bolts 322 extend out from a first housing 320 toward the disc wheel 22, not shown. The hub 30, not shown, is mounted to a second partition housing 324 by a plurality of hub mounting bolts, also not shown.

The two partition housings 320 and 324 are able to rotate relatively around, as well as move relatively in a direction parallel with, the detector axis. Rotational torque T is detected using this relative rotation and lateral force SF is detected using this relative movement.

A support member 328 is mounted to the second partition housing 324 in a fixed position behind the first partition housing 320. The first partition housing 320 is supported by the support member 328 so as to be able to rotate around the detector axis. The first partition housing 320 is prevented from separating from the second partition housing 324 by the support member 328.

Conversely, a plurality of balls 332, which serve as rolling elements, are provided between the first partition housing 320 and the second partition housing 324 so as to prevent the partition housings from contacting one another. Rotation of these balls 332 enables the first partition housing 320 and the second partition housing 324 to rotate smoothly relative to one another.

According to this exemplary embodiment, as opposed to the first exemplary embodiment, a cylindrical portion 336 of the first partition housing 320 has a smaller diameter than a cylindrical portion 338 of the second partition housing 324. Therefore, an inside surface of the cylindrical portion 336 of the first partition housing 320 faces the center portion of the second partition housing 324. The second partition housing 324 has an integrated protruding portion 342 in a position facing the inside surface of the cylindrical portion 336 of the first partition housing 320.

A screw mechanism 350 is provided between, and on the same axis as, the two partition housings 320 and 324. This screw mechanism 350 is constructed such that a shaft 354 screws into a nut 352. The shaft 354 is arranged on the same axis as the detector 318.

A bearing 356 is provided between each end of the nut 352 and the partition housings 320 and 324, and is on the same axis as the nut 352, such that the nut 352 is permitted to rotate smoothly relative to the two partition housings 320 and 324.

The dimensions of the shaft 354 in the axial direction are set shorter than the distance between bottom portions 358 and 360 of the two partition housings 320 and 324. Piezoelectric elements 362 and 364 are disposed between each end portion of the shaft 354 and each partition housing 320 and 324, respectively. Therefore, according to this exemplary embodiment, each of the end portions of the shaft 354 abuts against one of the piezoelectric elements 362 and 364 which in turn abuts against one of the partition housings 320 and 324. As a result, lateral force SF is able to be detected by the piezoelectric elements 362 and 364.

According to this exemplary embodiment, however, when lateral force SF is generated, a portion of that lateral force SF acts on the shaft 354 and the piezoelectric elements 362 and 364 when the two partition housings 320 and 324 are relatively close to one another because the two partition housings 320 and 324 are in contact with one another through the balls 332. On the other hand, a portion of that lateral force SF still acts on the shaft 354 and the piezoelectric elements 362 and 364 even when the two partition housings 320 and 324 are relatively distanced from one another because the two partition housings 320 and 324 are engaged with one another via the support member 328.

According to this exemplary embodiment, when the nut 352 is rotated in one direction, the shaft 354 moves in one direction such that one of the two piezoelectric elements 362 and 364, whichever is positioned in front of that shaft 354, is compressed. That piezoelectric element then outputs a voltage of an amount in accordance with that compression strain in the form of an electrical signal. At this time, no tensile force acts on the piezoelectric element, of the two piezoelectric elements 362 and 364, that is positioned behind the shaft 354.

According to the exemplary embodiment, a gear mechanism 370 is used for transmitting rotation torque T between the two partition housings 320 and 324 to the nut 352. The gear mechanism 370 has a construction similar to that of a planetary gear.

More specifically, the gear mechanism includes an input gear 372, a middle gear 374, and an output gear 376 together in series. The input gear 372 is formed as a ring gear on an outside surface of the protruding portion 342 of the second partition housing 324 and is on the same axis as the second partition housing 324. The middle gear 374 is a cylindrical gear that meshes with the input gear 372.

An outer gear 378 is formed as a ring gear on the inside surface of the cylindrical portion 336 of the first partition housing 320 and is on the same axis as the first partition housing 320. The middle gear 374 meshes with this outer gear 378 as well as with the input gear 372. A plurality of these middle gears 374 are disposed at evenly spaced intervals around the detector axis. Relative rotation of the two partition housings 320 and 324 produces relative displacement between the input gear 372 and the outer gear 378. This relative displacement causes each of the middle gears 374 to rotate around their own axes.

One output gear 376 is fixed to each of the middle gears 374 such that the output gear 376 revolves around the same axis as the axis around which the middle gear 374 rotates. According to this exemplary embodiment, one middle gear 374 and one output gear 376 are integrally formed together as a single member. The output gear 376 is arm-shaped and extends from the middle gear 374 toward the nut 352. Tooth planes are formed on tip portions of the output gear 376 and the output gear 376 meshes with the nut 352 at these tooth planes.

Therefore, according to this exemplary embodiment, the detector 318 on a whole is such that a plurality of output gears 376, each formed in an arm-like shape, extends radially outward at evenly spaced intervals from the detector axis. The screw mechanism 350 is then supported in a central location with respect to the plurality of output gears 376 by meshing therewith.

Accordingly, in this gear mechanism 370, if relative rotation is produced between the two partition housings 320 and 324, the middle gears 374 rotate accordingly and the output gears 376 slide at the same angle as the middle gears 374. The nut 352 then rotates in accordance with that sliding angle and the shaft 354 moves in accordance with that rotation angle.

According to this exemplary embodiment, not only the second axial force based on the lateral force SF but also the first axial force based on the rotational torque T is affected by the same shaft 354. Therefore, when the voltage generated in the piezoelectric elements 362 and 364 is only referenced, those two types of forces acting on the tire are not able to be separated and detected.

However, according to this exemplary embodiment, compression force is transmitted from the shaft 354 to each piezoelectric element 362 and 364 but tensile force is not. Therefore, a vector sum of the second axial force F2 based on the lateral force SF and the first axial force F1 based on the rotational torque T acts on the piezoelectric element, of the two piezoelectric elements 362 and 364, positioned on the front side in the direction in which the second axial force based on the lateral force SF acts. In contrast, only the second axial force F2 based on the lateral force SF acts on the piezoelectric element, of the two piezoelectric elements 362 and 364, positioned on the rear side in the direction in which the second axial force based on the lateral force SF acts.

Then according to this exemplary embodiment, by focusing on this kind of phenomenon, the first axial force F1 is calculated by subtracting the axial force converted from the output voltage of the rear side piezoelectric element from the axial force converted from the output voltage of the front side piezoelectric element. Also, the second axial force F2 is calculated as axial force converted from the output voltage of the rear side piezoelectric element. The determination of which one of the two piezoelectric elements 362 and 364 is the front side piezoelectric element and which one is the rear side piezoelectric element can be made, for example, by noting the fact that the larger of the axial forces converted from the output signals of the respective piezoelectric elements 362 and 364, respectively, is indicated by the output signal from the front side piezoelectric element.

That is, according to this exemplary embodiment, the first axial force F1 is calculated by removing the component of the second axial force F2 from the axial force converted from the output voltage of the front side piezoelectric element.

Therefore, according to this exemplary embodiment, it is possible to separate the first and second axial forces F1 and F2 from each other and detect them by using the characteristics of the transmission state of force between the two piezoelectric elements 362 and 364.

In this case, the relationship between the rotational torque T between the two partition housings 320 and 324 and rotational torque Q of the nut 352 is investigated. The radius of the input gear 372 is denoted as R1, the radius of the middle gear 374 is denoted as R2, the radius of the output gear 376 is denoted as R3, and the radius of the nut 352 is denoted as R4.

When considering that the amount of tangential force at the point where the gear pairs mesh is equal, and the rotational torque of the middle gear 374 between the input gear 372 and the middle gear 374 is denoted as S, then the following Expression 3 is obtained.

$$T/R1 = S/R2 \qquad \text{Expression 3:}$$

In addition, if the rotational torque of the middle gear 374 between the output gear 376 and the nut 352 is denoted as S, then the following Expression 4 is obtained.

$$S/R3 = Q/R4 \qquad \text{Expression 4:}$$

Therefore, the rotational torque Q of the nut 352 is expressed with Expression 5 below.

$$Q = T \times (R2/R1) \times (R4/R3) \qquad \text{Expression 5:}$$

Here, because the quotient of R2/R1, and the quotient of R4/R3, are both less then 1, the rotational torque Q is less than the rotational torque T.

Therefore, the gear mechanism 370 can be made so as to reduce the rotational torque T between the two partition housings 320 and 324 by increasing the relative rotational movement of the two partition housings 320 and 324 two gear speeds, and then transmit that reduced rotational torque T to the nut 352.

Thus, according to this exemplary embodiment, the rotational torque T is reduced and transmitted to the nut 352 by the gear mechanism 370. As a result, according to this exemplary embodiment, it is easy to design the detector 318 so that the load capacity that the screw mechanism 350 must withstand is reduced.

Further, reducing the rotational torque Q also tends to reduce the axial force transmitted from the shaft 354 to the piezoelectric elements 362 and 364. As a result, according to this exemplary embodiment, it is easy to design the detector 318 so that the load capacity that the piezoelectric elements 362 and 364 must withstand is reduced.

According to this exemplary embodiment, a preload is applied between the two partition housings 320 and 324 so as to press them toward one another. Therefore, according to this exemplary embodiment, a preload applying mechanism 382 is mounted on the first partition housing 320, as shown in FIG. 23. This preload applying mechanism 382 includes a pressing element 384 on the same axis as the detector 318, which presses the first partition housing 320 from behind.

The position of the pressing element 384 is regulated in the axial direction by a holder 386 mounted on the support member 328. The relative positions of the pressing element 384 and the first partition housing 320 in the axial direction are adjustable with holder 386. More specifically, the holder 386 is mounted to the support member 328 by a male screw, formed on the holder 386, and a female screw, formed on the support member 328, screwing together. If a worker changes the amount that the holder 386 is screwed into the support member 328, the relative position of the pressing element 384 with respect to the first partition housing 320 changes in the axial direction such that the amount of preload between the two partition housings 320 and 324 changes.

Next, a seventh exemplary embodiment of the invention will be described. This exemplary embodiment has many elements that are the same as those in the sixth exemplary embodiment. The only element that is different relates to the shape of the detecting element. Therefore, only this element will be described in detail. Elements in the seventh exemplary embodiment that are the same as those in the sixth exemplary embodiment are referred to by the same terminology and reference numerals as in the sixth exemplary embodiment, and explanations thereof will therefore be omitted.

According the sixth exemplary embodiment, the piezoelectric elements 362 and 364 are used as the detecting elements. However, in the seventh exemplary embodiment, a plurality of strain gauges 400 and 402 are used as the detecting elements, as shown in FIG. 24.

Figure 24:
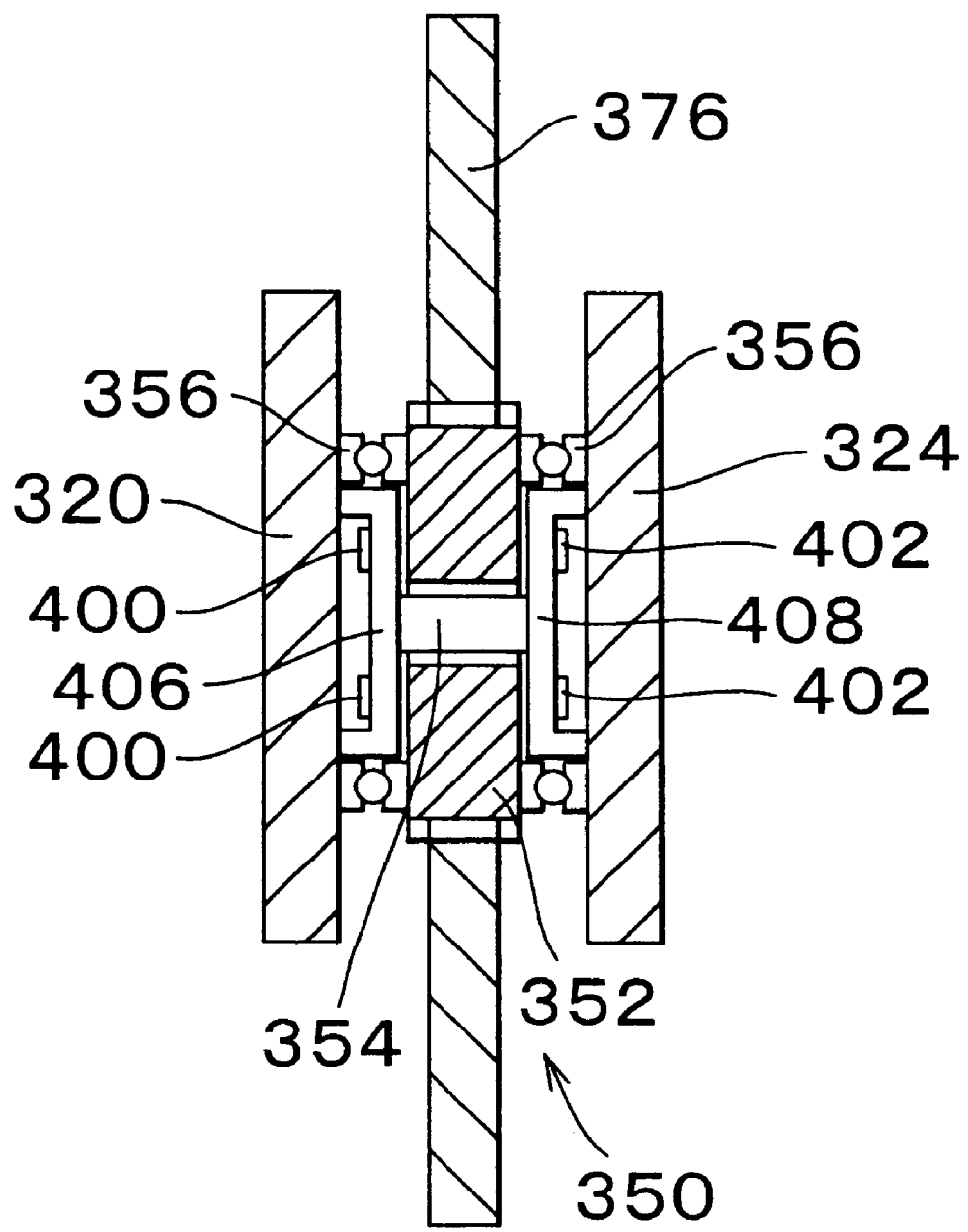
FIG. 24 is a partial sectional side view showing a main portion of a detector of a device for detecting force acting on a tire according to a seventh embodiment of the invention.

Referring to FIG. 24, detecting members 406 and 408 are provided in front of and in back of the shaft 354, respectively, in order to detect strain generated in accordance with outside force. Each detecting member 406 and 408 is less rigid than the two partition housings 320 and 324. Each detecting member 406 and 408 is sandwiched between the end portions of the shaft 354 and the two partition housings 320 and 324. One of the strain gauges 400 and 402 is mounted on each of the detecting members 406 and 408.

Therefore, according to this exemplary embodiment, when the shaft 354 is moved in one direction, a compression force is generated on one of the two detecting members 406 and 408 so that it bends. As a result, strain is generated in one of the strain gauges 400 and 402 that are tightly adhered to the detecting members 406 and 408. At this time, no tensile force is transmitted to the other one of the two detecting members 406 and 408 from the shaft 354. This point in this exemplary embodiment is the same as in the sixth exemplary embodiment.

Next, an eighth exemplary embodiment of the invention will be described. This exemplary embodiment has many elements that are the same as those in the first exemplary embodiment. The only element that is different relates to the power source. Therefore, only this element will be described in detail. Elements in the second exemplary embodiment that are the same as those in the first exemplary embodiment are referred to by the same terminology and reference numerals as in the first exemplary embodiment, and explanations thereof will therefore be omitted.

According to the first exemplary embodiment, the power source 216 is a consumption type power source as described above. Therefore, after the power source 216 has been consumed, it is necessary to replace it with a yet unused power source or recharge it from the outside.

Figure 25:
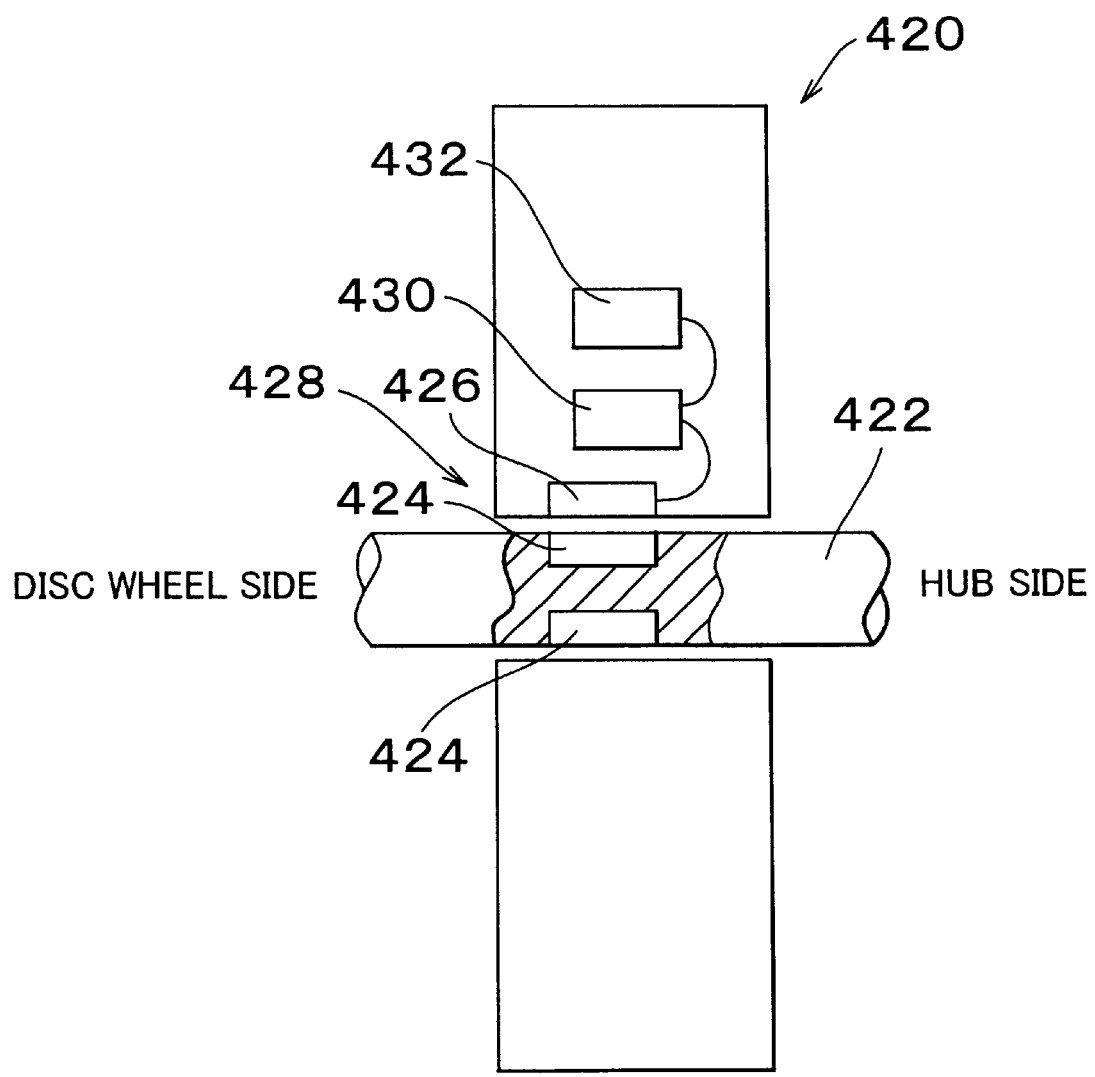
FIG. 25 is a partial sectional side view showing a portion relating to the power supply of a detector of the device for detecting force acting on a tire according to an eighth embodiment of the invention.

FIG. 25 shows a side view of a detector 420 of the device for detecting force acting on a tire according to the eighth exemplary embodiment. This detector 420 is the same as the detector 10 except in that it is hollow at its axis. A spindle 422 that is fixed non-rotatably to the vehicle body is passed through the axis of the detector 420.

A plurality of permanent magnets 424 are aligned with spaces therebetween in the circumferential direction on the outer periphery of the spindle 422. A coil 426 is arranged in a position so that it faces, across an air gap, the plurality of permanent magnets 424 in one of the detectors 420. The plurality of permanent magnets 424 and the coil 426 constitute a power generator 428 that generates power using the relative rotation of the permanent magnets 424 and the coil 426.

In the detector 420, the coil 426 is connected to a rechargeable battery 432 via a power control circuit 430. The power control circuit 430 is provided to recharge the rechargeable battery 432 with power generated in the coil 426, as well as to control the state of charge of the rechargeable battery 432. In this exemplary embodiment, the rechargeable battery 432 is connected to both the signal processing circuit 210 and the transmitter 214, both shown in FIG. 12, so as to supply them with the necessary power.

That is, according to this exemplary embodiment, the generator 428, the power control circuit 430, and the rechargeable battery 432 together comprise a self-sufficient power source. This self-sufficient power source constitutes one example of the power source.

In the illustrated embodiment, the apparatus is controlled by the controller (e.g., signal processing unit 222), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A device for detecting force acting on a vehicle wheel, which is mounted in a vehicle and which includes a disc wheel, and a vehicle body having a retaining body that rotatably retains the vehicle wheel integrally with the disc wheel and in which the disc wheel is mounted on the same axis as the vehicle wheel, the device comprising a detector mounted between the disc wheel and the retaining body to receive force that is transmitted between the disc wheel and the retaining body, and which detects force acting on the vehicle wheel, wherein the detector includes:
   a first moving portion and a second moving portion, both of which are provided between the disc wheel and the retaining body, on the same axis as the disc wheel and the retaining body, and which move together with the disc wheel and the retaining body, respectively; and
   a detecting portion that detects force acting on the vehicle wheel based on relative displacement between the first moving portion and the second moving portion.

2. The device according to claim 1, wherein the first moving portion and the second moving portion are constructed as a first partition housing and a second partition housing, respectively, forming a closed internal space therebetween by engaging the first moving portion and the second moving portion together such that they are relatively displaceable, and wherein the detecting portion is arranged in the internally formed space.

3. The device according to claim 1, wherein the detecting portion is arranged near a one of the first moving portion and the second moving portion that has the least tendency to increase in temperature when the vehicle is running.

4. The device according to claim 1, wherein the detecting portion includes:
   a detecting member which is lower in rigidity than the first moving portion and the second moving portion, and in which strain is generated having an amount in accordance with an amount of relative displacement between the first moving portion and the second moving portion by being engaged therewith; and
   a converter that converts the generated strain into an electrical signal.

5. The device according to claim 4, wherein the detecting member is mounted on, and so as to be movable relative to, the first moving portion and the second moving portion, respectively, to receive the force that is transmitted from the first moving portion and the second moving portion.

6. The device according to claim 4, wherein the detecting member is rigidly coupled to the first moving portion and the second moving portion, respectively.

7. The device according to claim 3, wherein the detecting member is a bent plate.

8. The device according to claim 1, wherein the detecting portion includes:
   a first motion converter that mechanically converts relative displacement motion of the first moving portion and the second moving portion into rotational motion around a rotational axis of the vehicle wheel;
   a second motion converter that mechanically converts the converted rotational motion into linear motion parallel with the rotational axis; and
   a converter that converts axial force based on the converted linear motion into an electrical signal.

9. The device according to claim 8, wherein:
   the relative displacement motion includes relative rotational motion around the rotational axis between the first moving portion and the second moving portion;
   the first motion converter includes a gear mechanism that increases a speed of rotational motion of an input gear from the relative rotational motion by at least one gear speed and transmits the rotational motion of increased speed to an output gear; and
   the second motion converter includes a screw mechanism that converts rotational motion of a nut from the output gear into linear motion of a shaft screwed into that nut.

10. The device according to claim 1, wherein the detecting portion independently detects a plurality of types of force acting on the vehicle wheel.

11. The device according to claim 1, wherein a plurality of the detecting portions are arranged at evenly spaced intervals around the rotational axis of the vehicle wheel.

12. The device according to claim 1, wherein force acting on the vehicle wheel has a forward direction and a reverse direction, and wherein the detecting portion detects the force acting on the vehicle wheel in both directions as well as identifies the direction of the force acting on the vehicle wheel.

13. The device according to claim 1, wherein force acting on the vehicle wheel has a forward direction and a reverse direction, and wherein the detecting portion detects the force acting on the vehicle wheel in only one of the forward direction and the reverse direction.

14. The device according to claim 1, wherein:
   the first moving portion and the second moving portion rotate relative to one another around the rotational axis of the vehicle wheel; and
   the detecting portion includes a longitudinal force detecting portion that detects longitudinal force acting on the vehicle wheel in the longitudinal direction of the vehicle wheel based on rotational torque which acts between the first moving portion and the second moving portion as a result of the relative rotation thereof.

15. The device according to claim 1, wherein:
   the first moving portion and the second moving portion move relative to one another in a lateral direction of the vehicle wheel; and
   the detecting portion includes a lateral force detecting portion that detects lateral force acting on the vehicle wheel in the lateral direction of the vehicle wheel based on axial force which acts between the first moving portion and the second moving portion as a result of the relative movement thereof.

16. The device according to claim 1, wherein:
   the first moving portion and the second moving portion move relative to one another in a vertical direction of the vehicle wheel; and the detecting portion includes a vertical force detecting portion that detects vertical force acting on the vehicle wheel in the vertical direction of the vehicle wheel based on axial force which acts between the first moving portion and the second moving portion as a result of the relative movement thereof.

17. The device according to claim 1, wherein:

the detecting portion includes a converter that converts at least one of strain and force generated based on a load transmitted from the first moving portion and the second moving portion to the detecting portion thereof into an electrical signal; and the detector further includes a reducing mechanism that mechanically reduces the at least one of the strain and force generated in the converter in proportion to the load.

18. The device according to claim 17, wherein the reducing mechanism achieves mechanical reduction of the at least one of the strain and the force by using a principle of leverage.

19. The device according to claim 18, wherein the detecting portion includes a detecting member which is lower in rigidity than the first moving portion and the second moving portion, and in which strain is generated having an amount in accordance with the amount of relative displacement between the first moving portion and the second moving portion by being engaged therewith, and wherein the detecting member functions as a lever to reduce the at least one of the strain and the force.

20. The device according to claim 1, wherein:

the detecting portion detects force acting on the vehicle wheel based on a load transmitted from the first moving portion and the second moving portion to the detecting portion; and the device for detecting force acting on a vehicle wheel further includes a limiting mechanism that mechanically limits the load transmitted from the first moving portion and the second moving portion to the detecting portion so as not to exceed a set limit.

21. The device according to claim 20, wherein the limiting mechanism limits a load exceeding the set limit from being transmitted to the detecting portion by allowing the first moving portion and the second moving portion to come into contact with each other after the amount of relative displacement between the first moving portion and the second moving portion has reached a reference value corresponding to the set limit.

22. The device according to claim 1, wherein:

the first moving portion and the second moving portion move relative to one another in the lateral direction of the vehicle wheel;

the detecting portion includes a lateral force detecting portion that detects lateral force acting on the vehicle wheel in the lateral direction of the vehicle wheel based on axial force which acts between the first moving portion and the second moving portion as a result of relative movement thereof, and the detector further includes a stopper that stops the first moving portion and the second moving portion from becoming separated from one another past a set limit in the lateral direction of the vehicle wheel by mechanical engagement.

23. The device according to claim 1, wherein the detector further includes a preload applying mechanism that applies a preload between the first moving portion and the second moving portion in a direction in which free relative displacement of the first moving portion and the second moving portion is suppressed.

24. The device according to claim 23, wherein:

the detecting portion includes a detecting member which is lower in rigidity than the first moving portion and the second moving portion, and which is elastically deformed in accordance with the amount of relative displacement between the first moving portion and the second moving portion by being engaged with the first and second moving portions; and the preload applying mechanism includes a position regulating mechanism that regulates the relative positions of the detecting member and the first moving portion and the second moving portion such that the detecting member is elastically deformed when force acting on the vehicle wheel is 0.

25. The device according to claim 1, wherein:

the detecting portion is a detecting element that converts force acting on the vehicle wheel into an electrical signal;

the detecting element outputs the electrical signal as an output signal which has a characteristic of changing in accordance with a rotation angle of the vehicle wheel even when an actual value of force acting on the vehicle wheel does not change; and the device for detecting force acting on a vehicle wheel further includes a controller that calculates force acting on the vehicle wheel based on the output signal of the detecting element while taking the characteristic into account.

26. The device according to claim 25, wherein:

the vehicle includes a vehicle wheel rotation angle sensor that detects a rotation angle of the vehicle wheel; and the controller calculates force acting on the vehicle wheel based on the output signal from the detecting element and an output signal from the vehicle wheel rotation angle sensor.

27. The device according to claim 25, wherein:

the vehicle includes a vehicle wheel rotation angle sensor that detects a rotation angle of the vehicle wheel; and the controller corrects the output signal from the detecting element based on the output signal from the vehicle wheel rotation angle sensor.

28. The device according to claim 1, wherein:

the detecting portion is a detecting element that converts force acting on the vehicle wheel into an electrical signal;

the detecting element outputs the electrical signal as an output signal which has a characteristic of changing cyclically in accordance with a rotation angle of the vehicle wheel even when the actual value of force acting on the vehicle wheel does not change, as well as a characteristic in that a maximum value of the output signal from the detecting element matches the actual value of force acting on the vehicle wheel; and the device for detecting force acting on a vehicle wheel further includes a controller that calculates the maximum value of the output signal from the detecting element as the force acting on the vehicle wheel.

29. The device according to claim 1, wherein:

four of the detecting portions are arranged at equally spaced intervals of 90 degrees each around the rotational axis of the vehicle wheel, and each detecting portion includes a detecting element that converts force acting on the vehicle wheel into an electrical signal;

the detecting element outputs the electrical signal as an output signal which has a characteristic of changing cyclically in accordance with a rotation angle of the vehicle wheel when the phase differs by 90 degrees with respect to an output signal of another detecting element even when the actual value of force acting on the vehicle wheel does not change; and the device for detecting force acting on the vehicle wheel also includes a controller that calculates force acting on the vehicle wheel using one of the output signals from the four detecting elements and the square root of a sum of squares of a calculated value indicative of the output signals from the four detecting elements.

30. The device according to claim 1, wherein:

the detecting portion includes a plurality of detecting elements that output an electrical signal to detect a plurality of different forces acting on the vehicle wheel, respectively, in which the electrical signal output from a first detecting element provided to detect a first force acting on the vehicle wheel has a characteristic of being affected by a second force acting on the vehicle wheel that is detected by a second detecting element; and the device for detecting force acting on a vehicle wheel further includes a controller that calculates the first force acting on the vehicle wheel based on the output signal from the first detecting element while taking the characteristic into account.

31. The device according to claim 30, wherein the controller removes a component affected by the second force acting on the vehicle wheel from the output signal of the first element based on the output signal from the second detecting element.

32. A device for detecting force acting on a vehicle wheel, which is mounted in a vehicle and which includes a disc wheel, and a vehicle body having a retaining body that rotatably retains the vehicle wheel integrally with the disc wheel and in which the disc wheel is mounted on the same axis as the vehicle wheel, the device comprising a detector mounted between the disc wheel and the retaining body to receive force that is transmitted between the disc wheel and the retaining body, and which detects force acting on the vehicle wheel, wherein the detector includes a detecting portion that detects force acting on the vehicle wheel and outputs an electrical signal indicative thereof, and a transmitter that transmits the electrical signal output from that detecting portion to an external receiver.

33. A device for detecting force acting on a vehicle wheel, which is mounted in a vehicle and which includes a disc wheel, and a vehicle body having a retaining body that rotatably retains the vehicle wheel integrally with the disc wheel and in which the disc wheel is mounted on the same axis as the vehicle wheel, the device comprising a detector mounted between the disc wheel and the retaining body to receive force that is transmitted between the disc wheel and the retaining body, and which detects force acting on the vehicle wheel, further comprising a tire mounted on a periphery of the disc wheel, and wherein the detected force acting on the vehicle wheel is a force acting on the tire.

34. A device for detecting force acting on a vehicle wheel, the device comprising:

a first portion that is connectable to a disc wheel;

a second portion that is connectable to a retaining body of a vehicle to which the disc wheel is mounted; and a detector connected between the first portion and the second portion to receive force that is transmitted between the disc wheel and the retaining body in order to detect force acting on the vehicle wheel, when the disc wheel is mounted to the retaining body, wherein:

the first portion and the second portion move together with the disc wheel and the retaining body, respectively; and the detector detects force acting on the vehicle wheel based on relative displacement between the first portion and the second portion.

35. The device according to claim 34, wherein the first portion and the second portion are constructed as a first partition housing and a second partition housing, respectively, forming a closed internal space therebetween by engaging the first portion and the second portion together such that they are relatively displaceable, and wherein the detector is arranged in the internally formed space.

36. The device according to claim 34, wherein the detector includes:

a detecting member which is lower in rigidity than the first portion and the second portion, and in which strain is generated having an amount in accordance with an amount of relative displacement between the first portion and the second portion by being engaged therewith; and a converter that converts the generated strain into an electrical signal.

37. The device according to claim 36, wherein the detecting member is mounted on, and so as to be movable relative to, the first portion and the second portion, respectively, to receive the force that is transmitted from the first portion and the second portion.

38. The device according to claim 34, wherein the detecting member is a bent plate.

39. The device according to claim 34, wherein the detector includes:

a first motion converter that mechanically converts relative displacement motion of the first portion and the second portion into rotational motion around a rotational axis of the vehicle wheel;

a second motion converter that mechanically converts the converted rotational motion into linear motion parallel with the rotational axis; and a converter that converts axial force based on the converted linear motion into an electrical signal.

40. The device according to claim 39, wherein:

the relative displacement motion includes relative rotational motion around the rotational axis between the first portion and the second portion;

the first motion converter includes a gear mechanism that increases a speed of rotational motion of an input gear from the relative rotational motion by at least one gear speed and transmits the rotational motion of increased speed to an output gear; and the second motion converter includes a screw mechanism that converts rotational motion of a nut from the output gear into linear motion of a shaft screwed into that nut.

41. The device according to claim 34, wherein the detector independently detects a plurality of types of force acting on the vehicle wheel.

42. The device according to claim 34, wherein a plurality of the detectors are arranged at evenly spaced intervals around a rotational axis of the vehicle wheel.

43. The device according to claim 34, wherein force acting on the vehicle wheel has a forward direction and a reverse direction, and wherein the detector detects the force acting on the vehicle wheel in both directions as well as identifies the direction of the force acting on the vehicle wheel.

44. The device according to claim 34, wherein force acting on the vehicle wheel has a forward direction and a reverse direction, and wherein the detector detects the force acting on the vehicle wheel in only one of the forward direction and the reverse direction.

45. The device according to claim 34, wherein:
the first portion and the second portion rotate relative to one another around a rotational axis of the vehicle wheel; and
the detector includes a longitudinal force detecting portion that detects longitudinal force acting on the vehicle wheel in the longitudinal direction of the vehicle wheel based on rotational torque which acts between the first portion and the second portion as a result of the relative rotation thereof.

46. The device according to claim 34, wherein:
the first portion and the second portion move relative to one another in a lateral direction of the vehicle wheel; and
the detector includes a lateral force detecting portion that detects lateral force acting on the vehicle wheel in the lateral direction of the vehicle wheel based on axial force which acts between the first portion and the second portion as a result of the relative movement thereof.

47. The device according to claim 34, wherein:
the first portion and the second portion move relative to one another in a vertical direction of the vehicle wheel; and
the detector includes a vertical force detecting portion that detects vertical force acting on the vehicle wheel in the vertical direction of the vehicle wheel based on axial force which acts between the first portion and the second portion as a result of the relative movement thereof.

48. The device according to claim 34, wherein:
the detector includes a converter that converts at least one of strain and force generated based on a load transmitted from the first portion and the second portion to the detector thereof into an electrical signal; and
the detector further includes a reducing mechanism that mechanically reduces the at least one of the strain and force generated in the converter in proportion to the load.

49. The device according to claim 34, wherein:
the detector detects force acting on the vehicle wheel based on a load transmitted from the first portion and the second portion to the detector; and
the device for detecting force acting on a vehicle wheel further includes a limiting mechanism that mechanically limits the load transmitted from the first portion and the second portion to the detector so as not to exceed a set limit.

50. The device according to claim 49, wherein the limiting mechanism limits a load exceeding the set limit from being transmitted to the detector by allowing the first portion and the second portion to come into contact with each other after the amount of relative displacement between the first portion and the second portion has reached a reference value corresponding to the set limit.

51. The device according to claim 34, wherein:
the first portion and the second portion move relative to one another in a lateral direction of the vehicle wheel;
the detector includes a lateral force detecting portion that detects lateral force acting on the vehicle wheel in the lateral direction of the vehicle wheel based on axial force which acts between the first portion and the second portion as a result of relative movement thereof; and
the detector further includes a stopper that stops the first portion and the second portion from becoming separated from one another past a set limit in the lateral direction of the vehicle wheel by mechanical engagement.

52. The device according to claim 34, wherein the detector further includes a preload applying mechanism that applies a preload between the first portion and the second portion in a direction in which free relative displacement of the first portion and the second portion is suppressed.

53. The device according to claim 52, wherein:
the detector includes a detecting member which is lower in rigidity than the first portion and the second portion, and which is elastically deformed in accordance with the amount of relative displacement between the first portion and the second portion by being engaged with the first and second portions; and
the preload applying mechanism includes a position regulating mechanism that regulates the relative positions of the detecting member and the first portion and the second portion such that the detecting member is elastically deformed when force acting on the vehicle wheel is 0.

54. The device according to claim 34, wherein:
the detector is a detecting element that converts force acting on the vehicle wheel into an electrical signal;
the detecting element outputs the electrical signal as an output signal which has a characteristic of changing in accordance with a rotation angle of the vehicle wheel even when an actual value of force acting on the vehicle wheel does not change; and
the device for detecting force acting on a vehicle wheel further includes a controller that calculates force acting on the vehicle wheel based on the output signal of the detecting element while taking the characteristic into account.

55. The device according to claim 54, wherein:
the vehicle includes a vehicle wheel rotation angle sensor that detects a rotation angle of the vehicle wheel; and
the controller calculates force acting on the vehicle wheel based on the output signal from the detecting element and an output signal from the vehicle wheel rotation angle sensor.

56. The device according to claim 34, wherein:
the detector is a detecting element that converts force acting on the vehicle wheel into an electrical signal;
the detecting element outputs the electrical signal as an output signal which has a characteristic of changing cyclically in accordance with a rotation angle of the vehicle wheel even when the actual value of force acting on the vehicle wheel does not change, as well as a characteristic in that a maximum value of the output signal from the detecting element matches the actual value of force acting on the vehicle wheel; and
the device for detecting force acting on a vehicle wheel further includes a controller that calculates the maximum value of the output signal from the detecting element as the force acting on the vehicle wheel.

57. The device according to claim 34, wherein:
the detector includes a plurality of detecting elements that output an electrical signal to detect a plurality of different forces acting on the vehicle wheel, respectively, in which the electrical signal output from a first detecting element provided to detect a first force acting on the vehicle wheel has a characteristic of being affected by a second force acting on the vehicle wheel that is detected by a second detecting element; and the device for detecting force acting on a vehicle wheel further includes a controller that calculates the first force acting on the vehicle wheel based on the output signal from the first detecting element while taking the characteristic into account.

58. The device according to claim 57, wherein the controller removes a component affected by the second force acting on the vehicle wheel from the output signal of the first detecting element based on the output signal from the second detecting element.

59. A device for detecting force acting on a vehicle wheel, the device comprising:

a first portion that is connectable to a disc wheel;

a second portion that is connectable to a retaining body of a vehicle to which the disc wheel is mounted; and a detector connected between the first portion and the second portion to receive force that is transmitted between the disc wheel and the retaining body in order to detect force acting on the vehicle wheel, when the disc wheel is mounted to the retaining body, wherein the detector includes a detecting portion that detects force acting on the vehicle wheel and outputs an electrical signal indicative thereof, and a transmitter that transmits the electrical signal output from that detecting portion to an external receiver.

60. A device for detecting force acting on a vehicle wheel, the device comprising:

a first portion that is connectable to a disc wheel;

a second portion that is connectable to a retaining body of a vehicle to which the disc wheel is mounted; and a detector connected between the first portion and the second portion to receive force that is transmitted between the disc wheel and the retaining body in order to detect force acting on the vehicle wheel, when the disc wheel is mounted to the retaining body, further comprising a tire mounted on a periphery of the disc wheel, and wherein the detected force acting on the vehicle wheel is a force acting on the tire.

* * * * *